US007230216B2

(12) United States Patent
Uchida et al.

(10) Patent No.: US 7,230,216 B2
(45) Date of Patent: Jun. 12, 2007

(54) INDUCTION HEATING METHOD AND UNIT

(75) Inventors: Naoki Uchida, Tamano (JP); Keiji Kawanaka, Tamano (JP); Hideyuki Nanba, Tamano (JP); Kazuhiro Ozaki, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 11/474,310

(22) Filed: Jun. 26, 2006

(65) Prior Publication Data

US 2006/0237449 A1 Oct. 26, 2006

Related U.S. Application Data

(62) Division of application No. 10/515,416, filed as application No. PCT/JP02/006419 on Jun. 26, 2002.

(30) Foreign Application Priority Data

Dec. 27, 2000 (JP) ............................ 2000-396936

(51) Int. Cl.
*H05B 6/04* (2006.01)
*H02J 3/26* (2006.01)

(52) U.S. Cl. ........................................ 219/662; 307/14

(58) Field of Classification Search ................ 219/662, 219/476, 656, 671, 717; 307/11, 13, 14; *H05B 6/04; H02J 3/26*
See application file for complete search history.

(56) References Cited

U.S. PATENT DOCUMENTS 5,250,777 A * 10/1993 Fishman .................... 219/619
5,268,547 A * 12/1993 Bessyo et al. .............. 219/716
5,822,669 A * 10/1998 Okabayashi et al. ........ 399/330
5,951,903 A * 9/1999 Isoyama et al. ............ 219/603
6,163,019 A * 12/2000 Green et al. ............... 219/660
6,248,984 B1 * 6/2001 Isoyama et al. ............ 219/603
6,528,770 B1 * 3/2003 Akel et al. .................. 219/624

FOREIGN PATENT DOCUMENTS

JP U 58-71483 5/1983

(Continued)

*Primary Examiner*—Daniel Robinson
(74) *Attorney, Agent, or Firm*—Oliff & Berridge PLC

(57) ABSTRACT

It is an object of the present invention to prevent temperature decrease in a border portion of each of heating coils and to enable to eliminate an influence given by the change in a load state. In order to attain this object, an induction heating unit according to the present invention is provided with control units respectively corresponding to a plurality of heating units. A phase detector of the control unit obtains a phase difference between an output current (heating coil current) of an inverter detected by a current transformer reference signal outputted by a reference signal generating section, and inputs it to a drive control section. The drive control section adjusts an output timing (phase) of a gate pulse to be given to the inverter so as to make a phase of the heating coil current of the inverter coincide with a phase of the reference signal outputted by the reference signal generating section. A phase control section controls a variable reactor so as to make the phases of an output voltage and the output current (heating coil current) of the inverter coincide with each other, and improves a power factor of the inverter. Each of the other control units also performs the same control operation.

2 Claims, 15 Drawing Sheets

FOREIGN PATENT DOCUMENTS

| | | |
|---|---|---|
| JP | A 62-110296 | 5/1987 |
| JP | A 02-010687 | 1/1990 |
| JP | U 3-39482 | 4/1991 |
| JP | U 3-79191 | 8/1991 |
| JP | A 7-135070 | 5/1995 |
| JP | A 2001-35645 | 2/2001 |

* cited by examiner

INDUCTION HEATING METHOD AND UNIT

This is a Division of application Ser. No. 10/515,416 filed May 18, 2005, which in turn is a U.S. National Stage of PCT/JP02/006419 filed Jun. 26, 2002. The disclosures of the prior applications are hereby incorporated by reference herein in their entireties.

BACKGROUND

The present invention relates to an induction heating method and unit, more particularly to an induction heating method and unit suitable for supplying electricity by resonance-type inverters provided to respectively correspond to plurality of heating coils which are disposed adjacent to each other.

Induction heating is to produce heat in such a manner that a magnetic field is generated by the passage of currents through heating coils to generate an overcurrent in a member to be heated, and it is adopted in various fields since it can generate a high temperature which cannot be obtained by resistance heating. FIG. 8 schematically shows the outline of an induction heating unit which hardens a roll of a rolling mill and so on.

In FIG. 8, a roll 10 is composed of a roll body 12 and journals 14 disposed at both ends thereof. When the roll 10 is to be hardened by the induction heating, a heating coil 16 which generates a magnetic field with a high magnetic flux density and a temperature keeping coil 18 which generates a magnetic field with a magnetic flux density lower than this are provided in an induction heating unit 15 and they are connected respectively to high-frequency power supplies 20, 22 constituted of corresponding inverters. These heating coil 16 and temperature keeping coil 18 are disposed adjacent to each other without any space being made therebetween, thereby preventing temperature decrease at a border portion between both of the coils 16, 18. In order to harden the roll 10, the roll 10 is moved forward toward the coils 16, 18 in a direction of an arrow 24 and a surface layer portion of the roll body 12 is heated at about 950° C.

FIG. 9 shows the outline of a partial electromagnetic induction heating unit. In this partial electromagnetic induction heating unit 30, a plurality of heating coils 32 (32*a* to 32*c*) are arranged coaxially in a vertical direction and connected respectively to high-frequency power supplies 34 (34*a* to 34*c*) constituted of corresponding inverters. For example, an end (lower end) of a carbon rod 36 is inserted into the heating coils 32, gas is supplied to the periphery of the carbon rod 36 to heat it at about 1500° C. by the heating coil 32, and the gas is caused to react to this. In this case, since the heat escapes upward, power supplies 34 are controlled so as to make a magnetic flux density become higher toward an upper one of the heating coils 32. Furthermore, the heating coils 32 are arranged adjacent to each other in order to prevent temperature decrease in border potions.

FIG. 10 shows the outline of a unit for heating a container by electromagnetic induction. In this induction heating unit 44, powdered silicon carbide (SiC) 42 is put inside a crucible 40 made of, for example, carbon, this is heated by heating coils 48 (48*a*, 48*b*), and the silicon carbide 42 is evaporated to be deposited in a work 46. The induction heating unit 44 includes the two heating coils 48*a*, 48*b* disposed coaxially in a vertical direction, which are connected respectively to high-frequency power supplies 50 (50*a*, 50*b*) constituted of inverters, and the heating coil 48*b* on a lower side generates a magnetic field with a high magnetic flux density to heat the silicon carbide 42.

FIG. 11 shows the outline of a so-called Baumkuchen-type induction heating unit. This induction heating unit 60 includes a doughnut-shaped stage 62 made of carbon or the like and a plurality of semiconductor wafers 64 are to be disposed on an upper surface of the stage 62. Heating coils 66 are disposed under the stage 62 so that the semiconductor wafers 64 can be heated by the passage of electricity through the heating coil 66. Furthermore, the heating coils 66 consist of an outer coil 66*a*, a center coil 66*b*, and an inner coil 66*c*, which are connected respectively to high-frequency power supplies 68 (68*a* to 68*c*) constituted of corresponding inverters so that the entire stage 62 can be uniformly heated. In this case, the coils 66*a* to 66*c* are also disposed adjacent to each other so as to be in contact with each other, thereby preventing temperature decrease in border portions of the coils.

FIG. 12 shows the outline of an induction heating unit for extrusion forming. This induction heating unit 70 includes a plurality of heating coils 72 (72*a* to 72*c*) arranged coaxially in a horizontal direction, which are connected respectively to high-frequency power supplies 74 (74*a* to 74*c*) constituted of corresponding inverters, and a metal material 76 placed inside the heating coils 72 is heated in such a manner that the temperature decreases from a front end portion in the workpiece toward a rear end portion in the workpiece. The heating coils 72*a* to 72*c* are disposed adjacent to each other to prevent temperature decrease in border portions. A similar induction heating unit is also used in a case of SSF (Semi Solid Forging) in which a metal material is forged in the state where a liquid phase and a solid phase coexist.

Since a high power efficiency can be obtained in induction heating, it is often performed by a so-called resonance-type inverter having a resonance circuit. Further, in the induction heating units having the plural heating coils as described above, the coils are disposed adjacent to each other in order to prevent the temperature decrease in the border portions of the respective heating coils. Consequently, mutual induction occurs among the plural heating coils since a magnetic flux generated by one of the heating coils influences the other heating coils. Therefore, in the induction heating unit including the heating coils corresponding to a plurality of inverters, since the state of the mutual induction among the heating coils changes due to load fluctuation and so on, distortion occurs in the current (heating coil current) in each of the heating coils and a phase deviation occurs between the heating coil currents. Consequently, in the induction heating unit including the heating coils corresponding to the plural inverters, unless the frequencies of the respective load currents are equalized and the phases of the respective heating coil currents are fixedly maintained, a highly precise control of a heating temperature becomes difficult and the temperature decrease in the border portions of the heating coils is caused.

Therefore, a method of preventing the occurrence of the adverse effect of the mutual induction has been proposed in which magnetic force shielding coils are inserted between heating coils and they absorb magnetic fluxes in end portions of the heating coils. It is also proposed that two heating coils are connected in parallel to one frequency converter (high-frequency inverter), a variable reactor is connected to one of the heating coils in series, and the variable reactor is adjusted by an L cycle to vary a voltage value (Japanese Utility Model Publication No. Hei 3-39482).

The method described above in which the magnetic force shielding coils are disposed in the border portions of the heating coils, however, cannot achieve uniform heating since the magnetic fluxes in the end portions of the coils are absorbed by the magnetic force shielding coils to cause the temperature decrease in these portions. The method in which the variable reactor is connected in series to one of the heating coils to vary a voltage by the variable reactor as described in Japanese Utility Model Publication No. 3-39482 also has such disadvantages that controlling the variable reactor changes the entire frequency, a time constant of power control is long, the power control of one unit changes a power value of each of the heating coils of the entire system so that it is difficult to independently control temperature for each of the heating coils, and so on.

Meanwhile, in each of the inverters, inverter output efficiency (power factor) becomes low unless a phase difference between its output current and output voltage is made small so that capacity decrease and efficiency degradation of the inverter are caused. Therefore, it is preferable that the inverter is operated in such a manner that its output current and output voltage are synchronized with each other.

The present invention is made to solve the disadvantages of the aforesaid prior arts and it is an object of the present invention to prevent the temperature decrease in the border portions of the heating coils and to enable the elimination of the influence caused by the mutual induction.

It is another object of the present invention to prevent the change in the state of the mutual induction.

It is still another object of the present invention to enable improvement in the power factor of the inverter.

SUMMARY

A first induction heating method according to the present invention is characterized in that resonance-type inverters respectively corresponding to a plurality of heating coils are operated in such a manner that frequencies of respective currents which are supplied to the heating coils respectively are equalized to each other and the currents are synchronized with each other or maintained at a phase difference to be set.

The currents can be synchronized with each other or maintained at the phase difference to be set by adjusting a phase of a drive signal given to each of the resonance-type inverters. A current signal to be equalized to can be a reference signal generated in an external part, and an operation can be performed based on this reference signal. Further, a current signal to be equalized to can be an output of any one of the aforesaid resonance-type inverters, and an operation can be performed based on this output signal. Further, a current signal to be equalized to may be an average value of phases of output currents of the respective resonance-type inverters, and an operation is performed based on this average current signal.

A second induction heating method according to the present invention is characterized in that a plurality of heating coils are supplied with electricity by resonance-type inverters respectively corresponding to the heating coils; with one of the resonance-type inverters being a main inverter and the other being a subordinate inverter, the aforesaid subordinate inverter is driven in such a manner that a phase of a current supplied to the heating coil on a subordinate side is synchronized with a phase of a current supplied to the heating coil on a main side or maintained at a phase difference to be set, based on a drive signal of the main inverter or an output voltage or an output frequency of the main inverter; and a phase difference between an output current and an output voltage of the subordinate inverter is adjusted by controlling a reactor on a subordinate inverter side to improve a power factor.

It is preferable that the phase difference between the output current and the output voltage of the subordinate inverter is adjusted after the phase difference between the current supplied to the heating coil on the main side and the current supplied to the heating coil on the subordinate side is obtained and the phase difference between the currents is adjusted by controlling the drive of the subordinate inverter.

A first induction heating unit according to the present invention is characterized in that it comprises: resonance-type inverters respectively corresponding to a plurality of heating coils; a phase detector for obtaining a phase difference between currents supplied respectively to the heating coils from the resonance-type inverters; and a drive control section for giving a drive signal to the resonance-type inverters based on the phase difference obtained by this phase detector to have frequencies of the currents respectively supplied to the heating coils equalized and to have the currents synchronized with each other or maintained at a phase difference to be set.

A second induction heating unit according to the present invention is characterized in that it comprises: resonance-type inverters respectively corresponding to a plurality of heating coils; a reference signal generating section for generating a reference signal to be given to these inverters; phase detectors which are provided to respectively correspond to the resonance-type inverters, each obtaining a phase difference between a current supplied to the corresponding one of the heating coils and the reference signal outputted by the reference signal generating section; and drive control sections which are provided to respectively correspond to the aforesaid resonance-type inverters, for driving the resonance-type inverters while controlling a drive signal to be given to the corresponding one of the aforesaid resonance-type inverters based on the phase difference obtained by the phase detector and the reference signal to equalize a frequency of the current supplied to each of said heating coils to said reference signal as well as to have a phase of each of the currents synchronized with the reference signal or maintained at a phase difference to be set.

Further, a third induction heating unit according to the present invention is characterized in that it comprises: resonance-type inverters respectively corresponding to a plurality of heating coils; a reference signal generating section for generating a reference signal to be given to these inverters; phase detectors which are provided to respectively correspond to the resonance-type inverters, each obtaining a phase difference between a current supplied to the corresponding one of the heating coils and the reference signal outputted by the reference signal generating section; drive control sections which are provided to respectively correspond to the resonance-type inverters, each driving the resonance-type inverters while controlling a drive signal to be given to the corresponding one of the resonance-type inverters based on the phase difference obtained by the phase detector and the reference signal to equalize a frequency of the current supplied to the corresponding one of the heating coils to the reference signal as well as to have a phase of the current synchronized with the reference signal or maintained at a phase difference to be set; variable reactors, each provided between the resonance-type inverter and the corresponding one of the heating coils; phase detecting sections which are provided to respectively correspond to the resonance-type inverters, each detecting a phase difference between an output current and an output voltage of the resonance-type inverter; and a phase adjusting section for adjusting the phase difference between the output current and the output voltage of the resonance-type inverter by controlling the variable reactor based on an output signal of each of the phase detecting sections to improve a power factor of each of the resonance-type inverters.

A fourth induction heating unit according to the present invention is characterized in that it comprises: a main inverter constituted of a resonance-type inverter; one subordinate inverter or more, each constituted of a resonance-type inverter; a plurality of heating coils provided to correspond to this subordinate inverter and the main inverter; a phase detector for obtaining a phase difference between a current through the heating coil on the main side and a current through the heating coil on the subordinate side; a drive control section on the main side for giving a drive signal to the main inverter; and a drive control section on the subordinate side for controlling a drive signal given to the subordinate inverter based on the drive signal outputted by this drive control section on the main side and the phase difference obtained by the phase detector to have a phase of the current through the heating coil on the subordinate side coincide with the current through the heating coil on the main side or maintained at a phase difference to be set.

A fifth induction heating unit according to the present invention is characterized in that it comprises: a main inverter constituted of a resonance-type inverter; one subordinate inverter or more, each constituted of a resonance-type inverter; a plurality of heating coils provided to correspond to this subordinate inverter and the main inverter; a phase detector for obtaining a phase difference between a current through the heating coil on the main side and a current through the heating coil on the subordinate side; a drive control section on the main side for giving a drive signal to the main inverter; and a drive control section on the subordinate side for controlling a drive signal given to the subordinate inverter based on an output current or an output voltage of the main inverter and the phase difference obtained by the phase detector to have a phase of the current through the heating coil on the subordinate side coincide with the current through the heating coil on the main side or maintained at a phase difference to be set.

Incidentally, it is possible to provide: a variable reactor provided between the subordinate inverter and the heating coil corresponding to this subordinate inverter; a phase detecting section for detecting a phase difference between an output current and an output voltage of the subordinate inverter; and a phase adjusting section for adjusting the phase difference between the output current and the output voltage of the subordinate inverter by controlling the variable reactor based on an output signal of the phase detecting section to improve a power factor of the subordinate inverter. Further, it is preferable that the main inverter and the subordinate inverter are respectively connected to corresponding output power control sections. The output voltage or the output current of the main inverter is fedback to the drive control section and the phases of the output voltage and the output current are made to coincide with each other.

In the induction heating method of the present invention as structured above, since the frequencies of the currents supplied to the plural heating coils are equalized and the phases are synchronized with each other or maintained at the phase difference to be set, the state of the mutual induction among the heating coils can be fixed without being influenced by the load fluctuation even when the load fluctuates. Therefore, no distortion of a waveform and so on occurs to the currents (heating coil currents) supplied to the respective heating coils due to the change in the mutual induction so that the inverters can operate normally, and even when the plurality of the heating coils are disposed adjacent to each other, the temperature can be easily and precisely controlled by the heating coils and the temperature decrease in the border portions of the heating coils can be prevented.

In the case when the phase of the drive signal given to the resonance-type inverters is adjusted, the adjustment based on the reference signal generated in a reference signal generating section or the like makes the control relatively easy so that an accurate phase adjustment can be made. The reference signal may be a waveform of a current or may also be any waveform in the form of a pulse and so on. Further, when the phase of the drive signal is adjusted in such a manner that any one of the plural resonance-type inverters is made to be a reference inverter, and with an output of this reference inverter (for example, an output current or an output voltage) serving as the reference signal, the phase of the other inverter is adjusted based on an output frequency of the reference inverter, no reference signal generating section is required so that the unit can be simplified. Moreover, the phase of the drive signal given to the resonance-type inverters is adjusted in such a manner that the average value of the phases, from a reference timing position, of the currents through the respective heating coils is obtained and the drive signal of the inverter is controlled so as to make each of the heating coil currents coincide with this average value.

In the induction heating method of the present invention, the subordinate inverter is driven in such a manner that the drive signal for driving the main inverter is given to the subordinate inverter, and based on this, the phase of the current supplied to the heating coil on the subordinate inverter side is synchronized with the phase of the current supplied to the heating coil on the main inverter side or the phase difference to be set is maintained therebetween, and in addition, by controlling the reactor on the subordinate inverter side, the phases of the output current and the output voltage of the subordinate inverter are made to coincide with each other. Therefore, according to the present invention, the phases of the currents through the heating coils of the main inverter and the subordinate inverter can be synchronized or fixed, a precise temperature control without any influence by the load fluctuation is possible, and the temperature decrease in the border portion of the heating coils can be avoided. In the main inverter, the drive control section makes the frequency adjustment so as to have the phases of the output voltage and the output current coincide with each other, and in the subordinate inverter, the reactor is adjusted so as to have the phases of the output current and the output voltage coincide with each other, and therefore, a power factor can be improved and output efficiency of the inverters can be enhanced so that decrease in operation efficiency can be prevented.

Furthermore, the phase difference between the output current and the output voltage of the subordinate inverter is adjusted after the phase difference between the current supplied to the heating coil on the main side and the current supplied to the heating coil on the subordinate side is obtained and the adjustment is made to eliminate this phase difference between the currents.

Incidentally, the same effect can be obtained when the output frequency of the output current or the output voltage of the main inverter is given as the drive signal of the subordinate inverter instead of the drive signal for driving the main inverter and the subordinate inverter is operated being synchronized with the output frequency of the main inverter or maintaining the phase difference to be set. Further, by providing the output power control sections to respectively correspond to the main inverter and the subordinate inverter, the amount of the output of each of the inverters can be freely controlled and heating temperature can be controlled freely and highly precisely.

DETAILED DESCRIPTION OF EMBODIMENTS

Preferred embodiments of an induction heating method and unit according to the present invention will be explained in detail with reference to the attached drawings.

Figure 1:
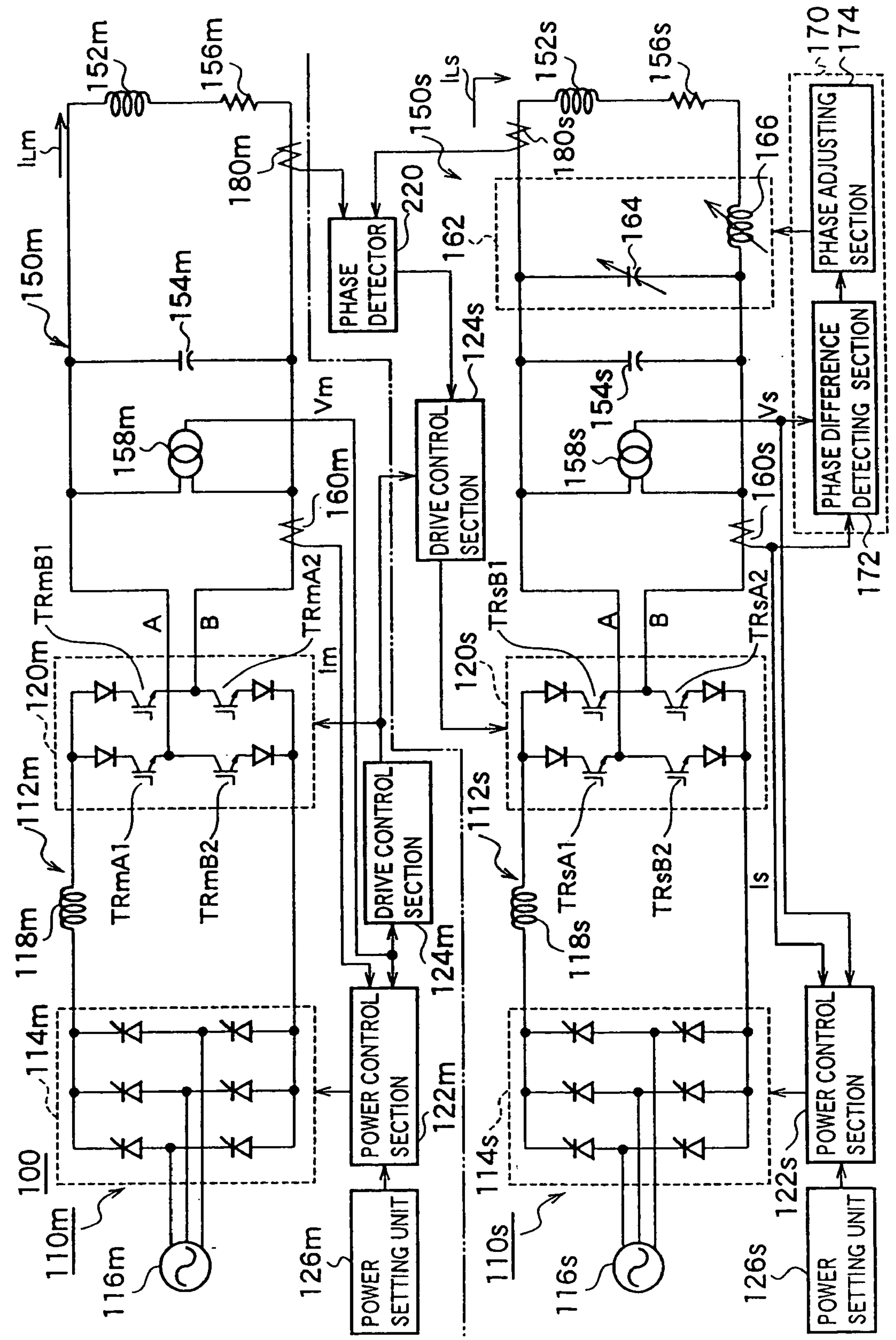
FIG. 1 is an explanatory view of an induction heating unit according to a first embodiment of the present invention.

FIG. 1 is an explanatory view of an induction heating unit according to a first embodiment of the present invention. An induction heating unit 100 according to this embodiment is composed of a pair of a main heating unit 110*m* and a subordinate heating unit 110*s*. The heating units 110*m*, 110*s* include power supply sections 112*m*, 112*s* and load coil sections 150*m*, 150*s* which are supplied with power from these power supply sections 112*m*, 112*s*, respectively.

The power supply sections 112*m*, 112*s* include forward converting sections 114*m*, 114*s* respectively, each being a rectifying circuit in which a bridge circuit is formed by thyristors, and these forward converting sections 114*m*, 114*s* are connected to three-phase AC power supplies 116*m*, 116*s* respectively. An inverter (inverse converting section) 120*m* and an inverter 120*s* are connected to output sides of the forward converting sections 114*m*, 114*s* via smoothing reactors 118*m*, 118*s*. In the embodiment, the inverter 120*m* on a main heating unit 110*m* side is a main inverter and the inverter 120*s* on a subordinate heating unit 110*s* side is a subordinate inverter. Each of the inverters 120*m*, 120*s* is a current type in the embodiment and is formed by a bridge circuit which is composed of arms made by connecting diodes and transistors in series as is generally known.

The load coil sections 150*m*, 150*s* connected to the output sides of the inverters 120*m*, 120*s* have heating coils 152*m*, 152*s* which are load coils. Each of condensers 154*m*, 154*s* is connected in parallel to each of the heating coils 152*m*, 152*s* and their internal resistances 156*m*, 156*s* so that the heating coils 152 and the condensers 154 form parallel resonance circuits. In other words, the inverters 120*m*, 120*s* constitute the parallel resonance-type inverters in the embodiment. The heating coils 152*m*, 152*s* are disposed adjacent to each other in the embodiment.

In the load coil sections 150*m*, 150*s*, transformers 158*m*, 158*s* are provided in parallel to the condensers 154*m*, 154*s* respectively and they can obtain voltage values corresponding to output voltages of the inverters 120*m*, 120*s*. An output voltage Vm of the transformer 158*m* on the main heating unit 110*m* side is fedback to a power control section 122*m* and a drive control section 124*m* on the main side which will be detailed later. Meanwhile, an output voltage Vs of the transformer 158*s* on the subordinate heating unit 110*s* side is fedback to the power control section 122*s* on the subordinate side. Furthermore, current transformers 160*m*, 160*s* for detecting output currents Im, Is of the inverters 120*m*, 120*s* are provided between the inverters 120*m*, 120*s* and the condensers 154*m*, 154*s*. The output currents Im, Is detected by the transformers 160*m*, 160*s* are fedback to the corresponding power control sections 122*m*, 122*s*.

The power control sections 122*m*, 122*s* give drive pulses to the thyristors constituting the forward converting sections 144*m*, 114*s* respectively and power setting units 126*m*, 126*s* are connected thereto. The drive control section 124*m* on the main side detects a zero-cross of the voltage Vm inputted from the transformer 158*m* and outputs a drive pulse to transistors $TRMA_1$, $TRmA_2$, $TRmB_1$, $TRmB_2$ constituting the inverter 120*m* in synchronization with this zero-cross. The drive control section 124*m* also inputs a signal in synchronization with the aforesaid drive pulse to the drive control section 124*s* on the subordinate side. The drive control section 124*s* on the subordinate side generates a pulse for driving transistors $TRsA_1$, $TRsA_2$, $TRsB_1$, $TRsB_2$ constituting the inverter 120*s* on the subordinate side based on the signal inputted from the drive control section 124*m* on the main side and gives it to these transistors.

A phase detector 220 is provided in the subordinate heating unit 110*s*. This phase detector 220, which is to obtain a phase difference $\phi_{ms}$ between a heating coil current $I_{Lm}$ supplied to the heating coil 152*m* on the main side and a heating coil current $I_{Ls}$ supplied to the heating coil 152*s* on the subordinate side, is so structured that the detected currents by the current transformers 160*m*, 160*s* are inputted thereto. Specifically, heating coil current detectors 180*m*, 180*s* are provided in series to the heating coils 152*m*, 152*s* between the heating coils 152*m*, 152*s* and the condensers 158*m*, 158*s* in the load coil sections 150*m*, 150*s*. The heating coil current detectors 180*m*, 180*s* detects the corresponding heating coil currents $I_{Lm}$, $I_{Ls}$ to input them to the phase detector 220. The phase detector 220, after obtaining the phase difference $\phi_{ms}$ between the heating coil current $I_{Lm}$ and the heating coil current $I_{Ls}$ inputs it to the drive control section 124s on the subordinate side. The drive control section 124s on the subordinate side adjusts a phase of the drive signal (gate pulse) to be given to the inverter 120s on the subordinate side based on an output signal of the phase detector 220 in such a manner that phases of the heating coil currents $I_{Im}$ and $I_{Is}$ coincide with each other, as will be detailed later.

The subordinate heating unit 110s has a phase control section 170 for making a phase difference between an output current Is and an output voltage Vs of the inverter 120s zero, as will be detailed later. This phase control section 170 is composed of: a phase difference detecting section 172 to which the voltage Vs and the current Is outputted by the transformer 158s and the current transformer 160s are inputted; and a phase adjusting section 174 for controlling, based on an output signal of this phase difference detecting section 172, a variable reactor section 162 provided between the inverter 120s and the heating coil 152s. In the embodiment, the variable reactor section 162 is composed of: a variable capacity reactance 164 connected in parallel to the heating coil 152s and the condenser 154s; and a variable induction reactance 166 connected in series to the heating coil 152s.

Figure 2:
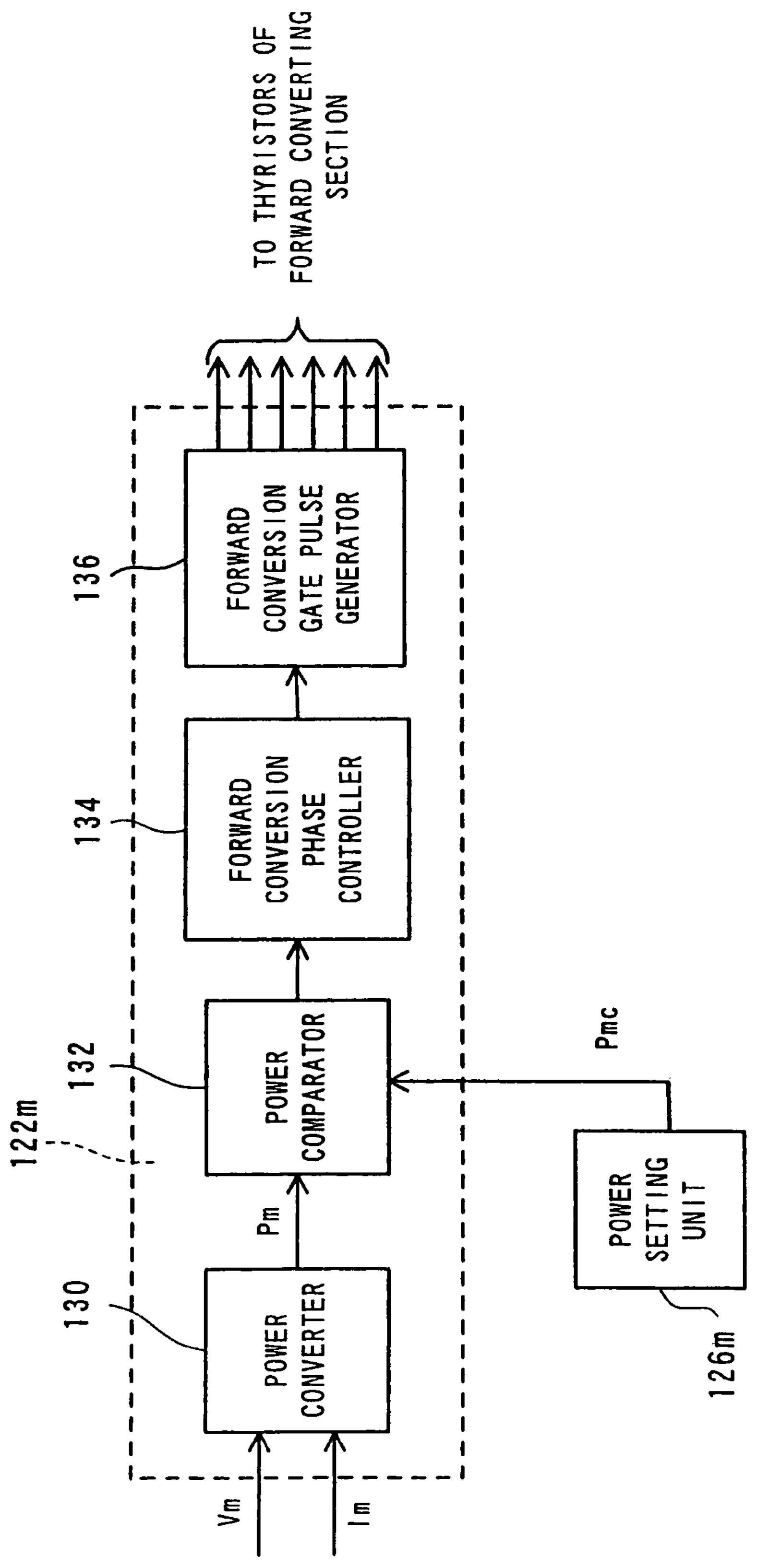
FIG. 2 is a detailed explanatory view of a power control section according to the embodiment of the present invention.

In the induction heating unit 100 as structured above, the heating coil 152m of the main heating unit 110m and the heating coil 152s of the subordinate heating unit 110s are disposed adjacent to each other. In the power supply sections 112m, 112s, the thyristors of the forward converting sections 114m, 114s are driven by the drive pulses outputted by the power control sections 122m, 122s respectively, rectify AC powers outputted by the three-phase AC power supplies 116m, 116s to convert them to DC powers, and give them to the inverter (inverse converting section) 120m and the inverter 120s via the smoothing coils 118m, 118s. The power control section 122m is structured as shown in FIG. 2. The power control section 122s on the subordinate side has the same structure.

Specifically, the power control section 122m is composed of a power converter 130 to which the output voltage Vm of the transformer 158m and the output current Im of the current transformer 160m are inputted, a power comparator 132 provided on an output side of the power converter 130, a forward conversion phase controller 134 connected to an output side of the power comparator 132, and a forward conversion gate pulse generator 136 to which an output signal of this forward conversion phase controller 134 is inputted.

The power converter 130 obtains an output power Pm of the inverter 120m based on the inputted voltage value Vm and current value Im to output it to the power comparator 132. The power comparator 132, to which the power setting unit 126m is connected, compares the power value Pm obtained by the power converter 130 with a set value Pmc outputted by the power setting unit 126m and sends out an output signal corresponding to a deviation between them to the forward conversion phase controller 134. Then, according to the output signal of the power comparator 132, the forward conversion phase controller 134 adjusts the timing of generating the gate pulse to be given to each of the thyristors which constitute the forward converting section 114m and obtains the timing of driving the thyristors which causes the detected difference between the power voltage value Pm and the set value Pmc to become zero. The forward conversion phase controller 134 gives a drive signal to the forward conversion gate pulse generator 136 according to the obtained drive timing. The forward conversion gate pulse generator 136 generates a gate pulse in synchronization with the output signal of the forward conversion phase controller 134 and gives it to each of the thyristors of the forward converting section 114m as a drive signal. Incidentally, an output power of each of the thyristors can be changed by varying the set value Pmc of the power setting unit 126m.

Figure 3:
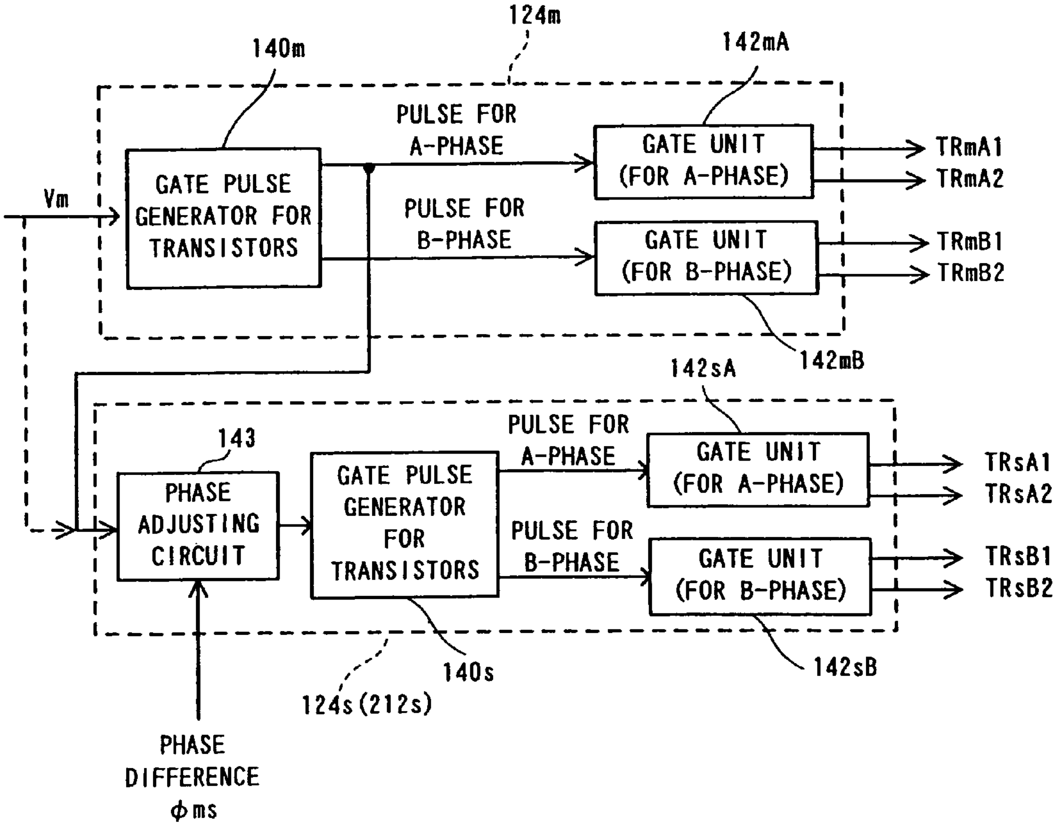
FIG. 3 is a detailed explanatory view of a drive control section according to the embodiment.
Figure 4:
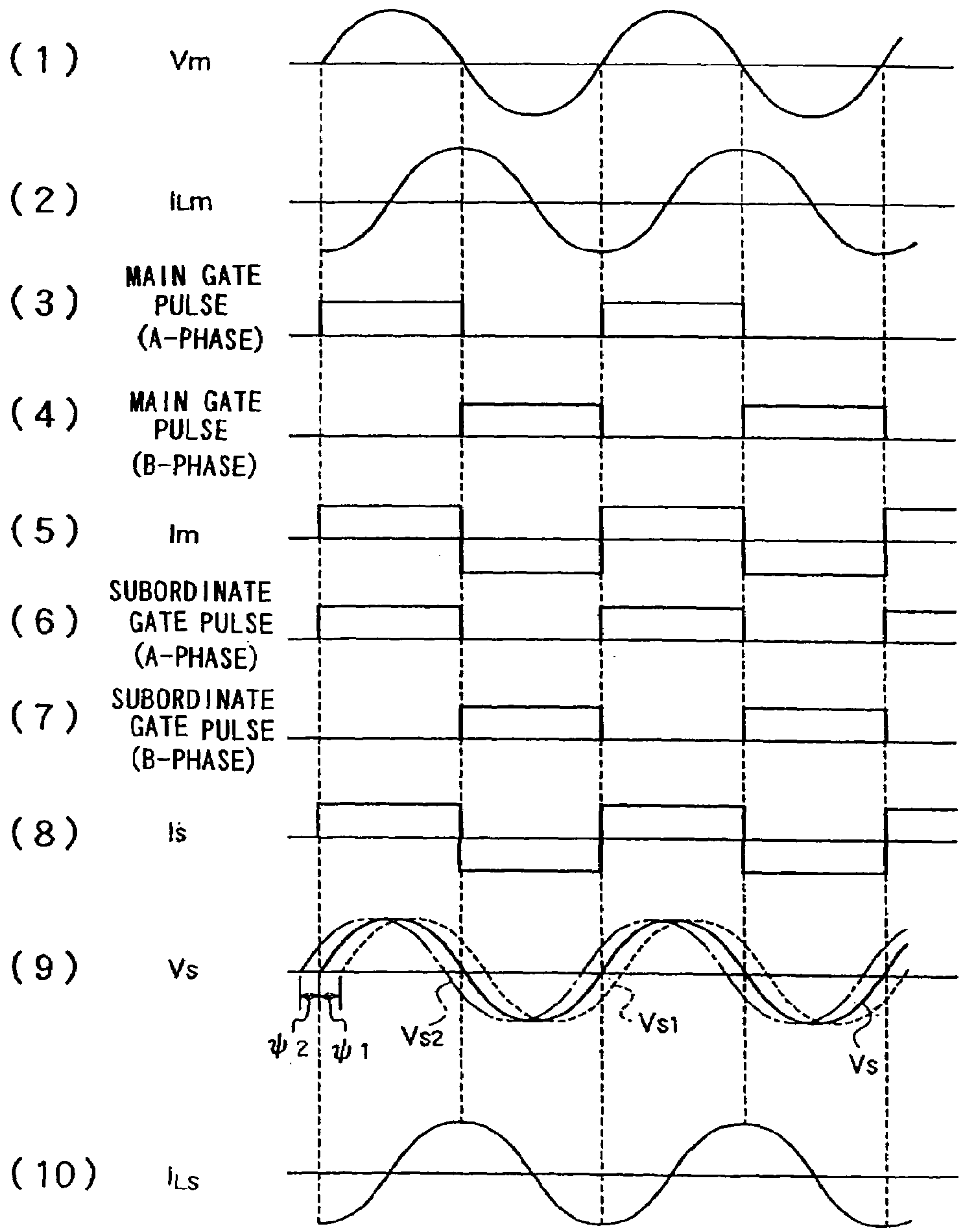
FIG. 4 is a time chart explaining the operation of an inverter according to the embodiment.

The drive control sections 124m, 124s for driving the inverters 120m, 120s are structured as shown in FIG. 3. Specifically, the drive control section 124m and the drive control section 124s have gate pulse generators 140m, 140s for transistors respectively and a pair of gate units 142mA, 142mB and a pair of gate units 142sA, 142sB are connected to output sides thereof respectively. Furthermore, the drive control section 124s on the subordinate side is provided with a phase adjusting circuit 143. This phase adjusting circuit 143, which is a load current control section, is to adjust the phases of the heating coil currents $I_{Lm}$, $I_{Ls}$ through the heating coil 152m on the main side and the heating coil 152s on the subordinate side to coincide (synchronize) with each other, and the gate pulse generator 140s for transistors is connected to an output side of the phase adjusting circuit 143. Furthermore, an output pulse of the gate pulse generator 140m for transistors on the main side and the phase difference $\phi_{ms}$ between the heating coil currents $I_{Lm}$, $I_{Lm}$ obtained by the phase detector 220 are inputted to the phase adjusting circuit 143. The drive control section 124m on the main side is so structured that the output voltage Vm of the transformer 158m is fedback to the gate pulse generator 140m for transistors. As shown in FIG. 4, the gate control section 124m is so structured that the gate pulse generator 140m detects the zero cross of the voltage Vm to generate the gate pulse for driving the transistors and inputs it to gate units 142mA, 142mB while giving it to the drive control section 124s on the subordinate side as a synchronization signal.

In the embodiment, the gate pulse generator 140m for transistors of the drive control section 124m, after the voltage Vm which changes as shown in FIG. 4 (1) is inputted thereto, generates the gate pulse for driving the transistors $TRMA_1$, $TRmA_2$ for A phase to output it to the gate unit 142mA and the phase adjusting circuit 143 on the subordinate side, as shown in FIG. 4 (3) when the voltage Vm zero-crosses from a lower side. The gate unit 142mA gives the gate pulse inputted from the gate pulse generator 140m to bases of the transistors $TRmA_1$, $TrRmA_2$ as a drive signal. Meanwhile, when the voltage Vm zero-crosses from an upper side, the gate pulse generator 140m stops the generation of the gate pulse for A phase and generates the gate pulse for driving the transistors $TRmB_1$, $TRmB_2$ for B phase as shown in FIG. 4 (4) to output it to the gate unit 142mB. The gate unit 142mB gives the inputted gate pulse to bases of the transistors $TrmB_1$, $TrmB_2$ for B phase to drive them. Thereby, the inverter 120m on the main side is driven with its own frequency and the current Im synchronized with the voltage Vm is outputted as shown in FIG. 4 (5) and a power factor becomes about 1. Further, as shown in FIG. 4 (2), the heating coil current $I_{Lm}$ is given to the heating coil 152m.

Meanwhile, the phase adjusting circuit 143 of the drive control section 124s on the subordinate side outputs a signal to the gate pulse generator 140s for transistors in synchronization with the rising and falling of the pulse outputted by the gate pulse generator 140m on the main side. The gate pulse generator 140s, when the pulse is inputted thereto from the phase adjusting circuit 143, outputs, in synchronization with this pulse, a pulse for A phase to the gate unit 142sA for A phase as shown in FIG. 4 (6). The gate unit 142sA gives the inputted pulse to bases of the corresponding transistors $TRsA_1$, $TRsA_2$ as a drive signal to operate them. Meanwhile, the gate pulse generator 140*s* on the subordinate side generates a pulse for B phase to give it to the gate unit 142*s*B for B phase as shown in FIG. 4 (7). The gate unit 142*s*B drives the transistors $TRsB_1$, $TRsB_2$ based on the inputted pulse. Thereby, the inverter 120*s* outputs the current Is synchronized with the current Im outputted by the inverter 120*m* on the main side as shown in FIG. 4 (8) and the heating coil current $I_{Ls}$ is supplied to the heating coil 152*s* (refer to FIG. 4 (10)).

Figure 5:
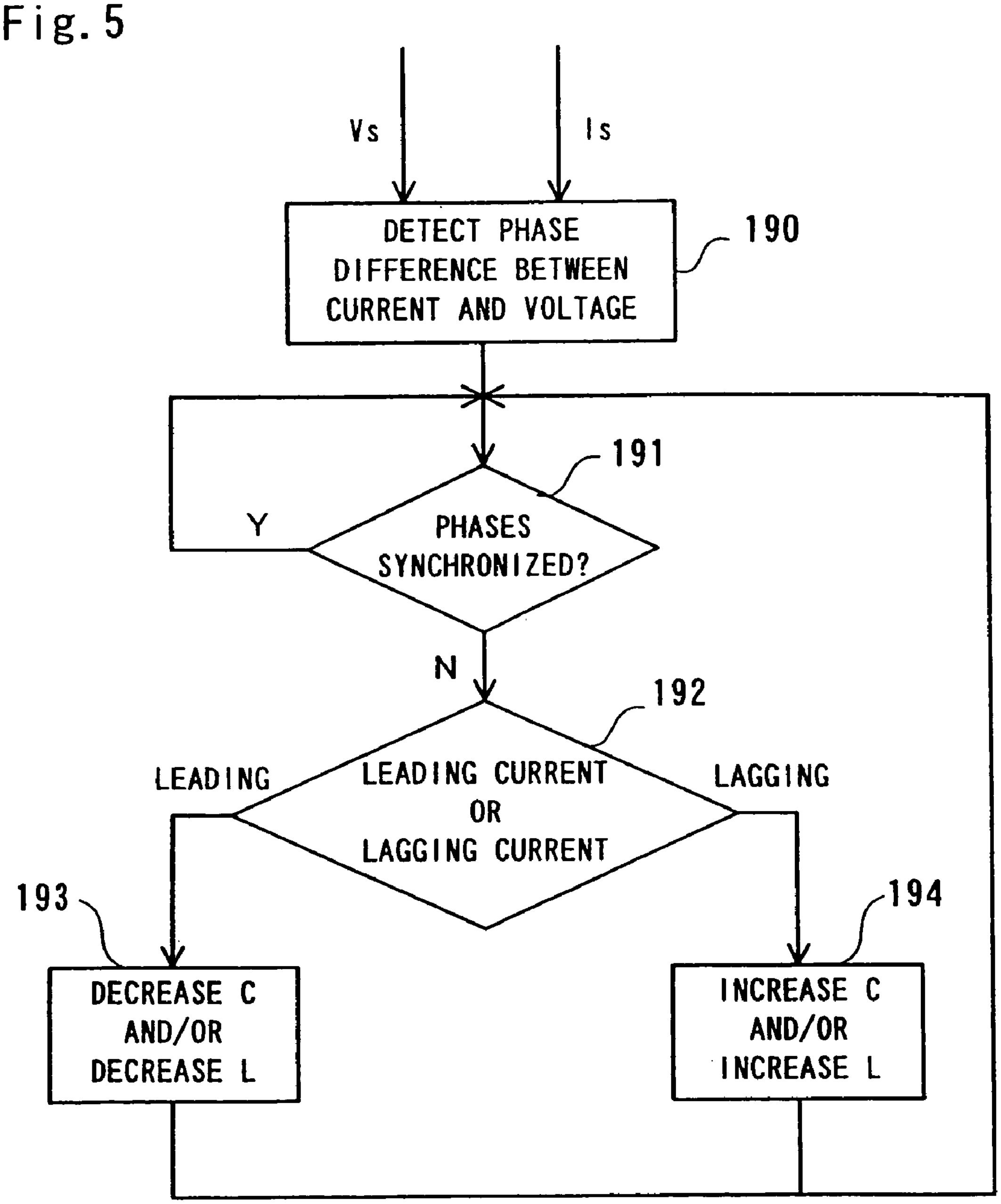
FIG. 5 is a flow chart explaining the act of a phase control section according to the embodiment.

The output voltage Vs and the output current Is of the inverter 120*s* which are detected by the transformer 158*s* and the current transformer 160*s* provided on the output side of the inverter 120*s* on the subordinate side are inputted to the phase difference detecting section 172 of the phase control section 170 provided in the subordinate heating unit 110*s*. The phase difference detecting section 172 obtains a phase difference between them to input it to the phase adjusting section 174. When, after the heating coil currents $I_{Lm}$, $I_{Ls}$ flow through the heating coils 152*m*, 152*s*, a phase deviation occurs between them due to load fluctuation and so on and a phase deviation occurs between the output voltage Vs and the output current Is of the inverter 120*s* on the subordinate side due to the change in the mutual induction state between the heating coils 152*m*, 152*s*, the phase adjusting section 174 controls the variable reactor section 162 so as to have their phases coincide with each other. FIG. 5 is a flow chart explaining the operation of the phase control section 170.

The phase difference detecting section 172 of the phase control section 170, when the voltage Vs and the current Is are inputted thereto from the transformer 158*s* and the current transformer 160*s* on the subordinate side, detects a phase difference between them and obtains a phase angle $\phi$ to output it to the phase adjusting section 174, as shown in Step 190 in FIG. 5. The phase adjusting section 174, when the phase angle $\phi$ outputted by the phase difference detecting section 172 is inputted thereto, judges whether or not the phases of the voltage Vs and the current Is coincide with each other, namely, $\phi=0$ (Step 191). When the phases coincide with each other, it reads a subsequent phase angle $\phi$ outputted by the phase difference detecting section 172.

The phase adjusting section 174, when its judgment is not the phase angle $\phi=0$ in Step 191, proceeds to Step 192 and judges whether the phase of the current Is is ahead of or behind the phase of the voltage Vs. When the phase of the voltage Vs ($Vs_1$) is behind the phase of the current Is namely, the phase of the current is ahead of the phase of the voltage, by a phase angle $\phi_1$, as shown by the dashed line in FIG. 4 (9), the phase adjusting section 174 decreases C of the variable capacity reactance 164 of the variable reactor section 162, decreases L of the variable induction reactance 166 of the variable reactor section 162, or decreases both of them according to the phase angle $\phi_1$, as shown in Step 193, thereby putting forward the phase of the voltage Vs or delaying the phase of the current Is to have the phase of the voltage Vs coincide with the phase of the current Is as shown by the solid line in FIG. 4 (9).

The phase adjusting section 174, when judging in Step 192 that the phase of the voltage Vs ($Vs_2$) is ahead of the phase of the current Is (the phase of the current is behind the phase of the voltage) by $\phi_2$ as shown by the broken line in FIG. 4 (9), proceeds to Step 194 from Step 192 and increases C of the variable capacity reactance 164, increases L of the variable induction reactance 166, or increases both of them to delay the phase of the voltage Vs or put forward the phase of the current Is, according to the phase angle $\phi_2$, thereby causing the phases of the voltage Vs and the current Is to coincide with each other. Consequently, a power factor of the inverter 120*s* is improved so that operation efficiency can be enhanced.

Figure 7:
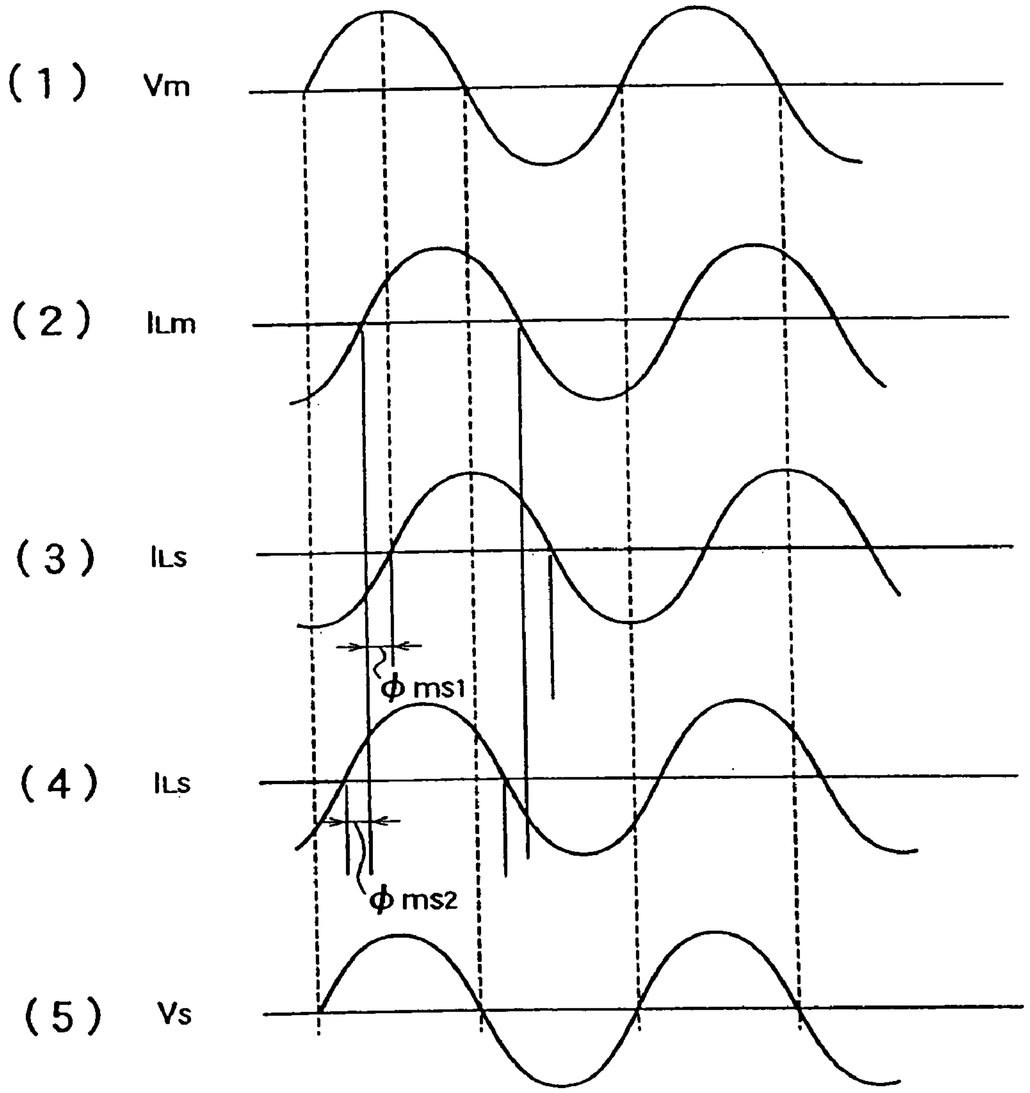
FIG. 7 is an explanatory view of a method of adjusting a phase difference between a heating coil current on a main side and a heating coil current on a subordinate side according to the embodiment.
Figure 8:
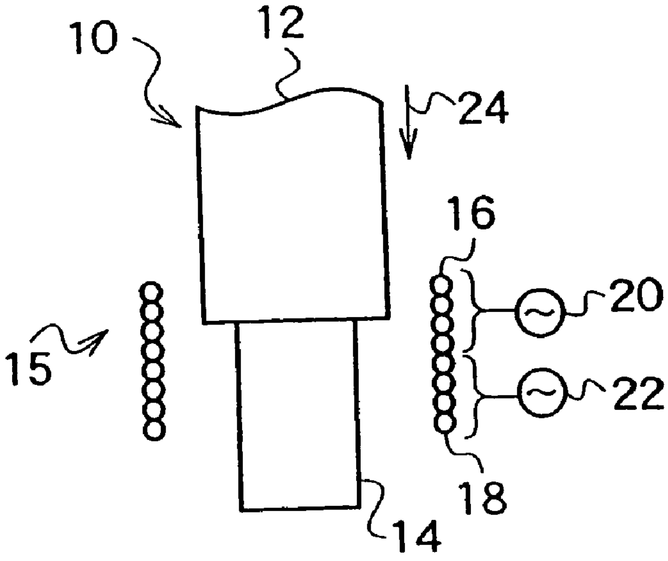
FIG. 8 is an explanatory view of a method of hardening a roll by induction heating.
Figure 9:
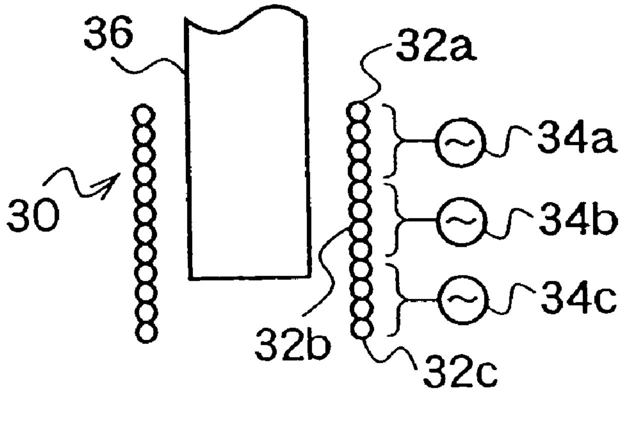
FIG. 9 is a diagrammatic explanatory view of a partial induction heating unit.
Figure 10:
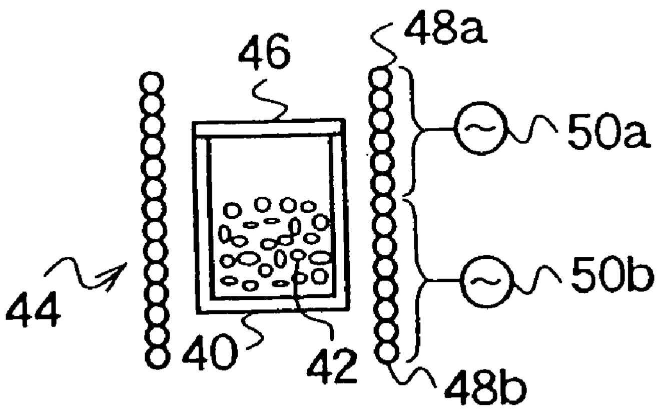
FIG. 10 is a view explaining heating of a container by the induction heating.
Figure 11:
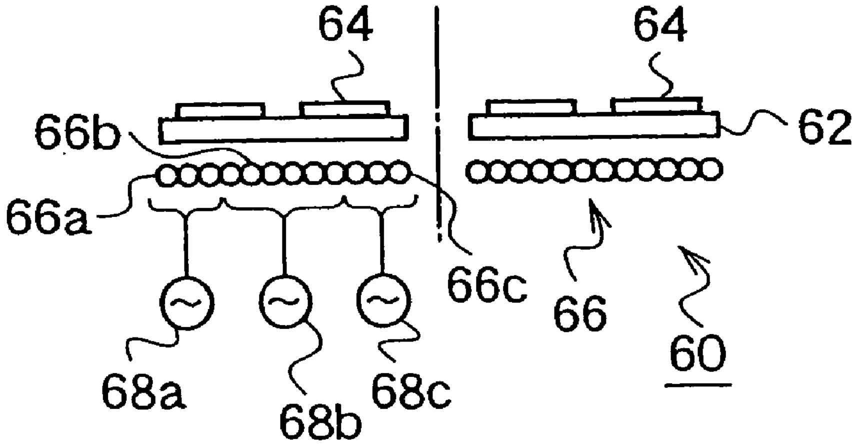
FIG. 11 is a diagrammatic explanatory view of a so-called Baurikuchen-type induction heating unit.
Figure 12:
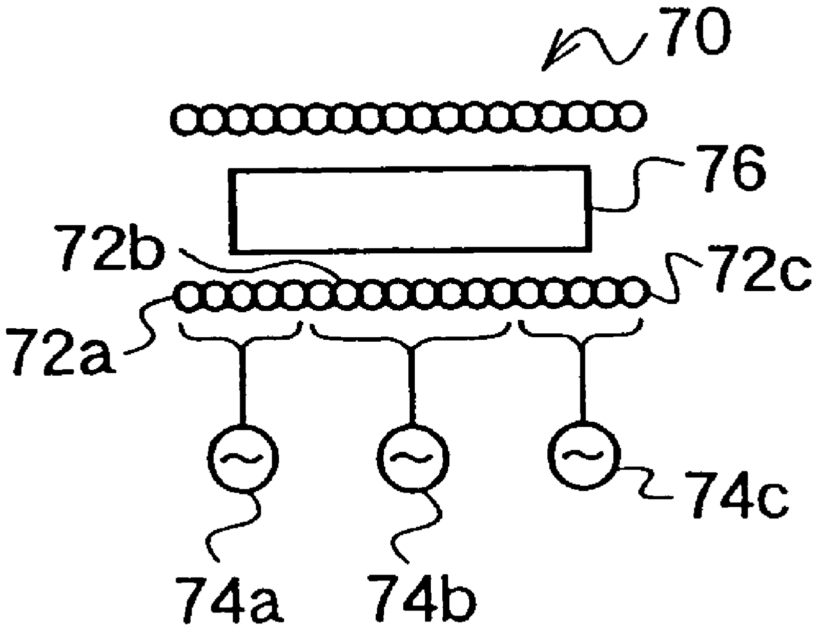
FIG. 12 is a diagrammatic explanatory view of an induction heating unit for extrusion forming.

The main inverter 120*m* and the subordinate inverter 120*s* are operated in this way. But a phase deviation as shown in FIG. 7 sometimes occurs between the heating coil current $I_{Lm}$ supplied to the heating coil 152*m* on the main side and the heating coil current $I_{Ls}$ supplied to the heating coil 152*s* on the subordinate side due to load fluctuation and so on. Consequently, the state of the mutual induction between the heating coils 152*m* and 152*s* changes. Therefore, in this embodiment, the phase difference $\phi_{ms}$ between the heating coil currents $I_{Lm}$ and $I_{Ls}$ is detected by the phase detector 220 and it is inputted to the phase adjusting circuit 143 of the drive control section 124*s* on the subordinate side as shown in FIG. 3. When the phase of the heating coil current $I_{Ls}$ on the subordinate side is behind the phase of the heating coil current $I_{Lm}$ on the main side by, for example, $\phi_{ms1}$ as shown in FIG. 7 (3), the phase adjusting circuit 143 puts forward the timing of generating the signal to be given to the gate pulse generator 140*s* to eliminate this phase difference $\phi_{ms1}$.

Figure 13:
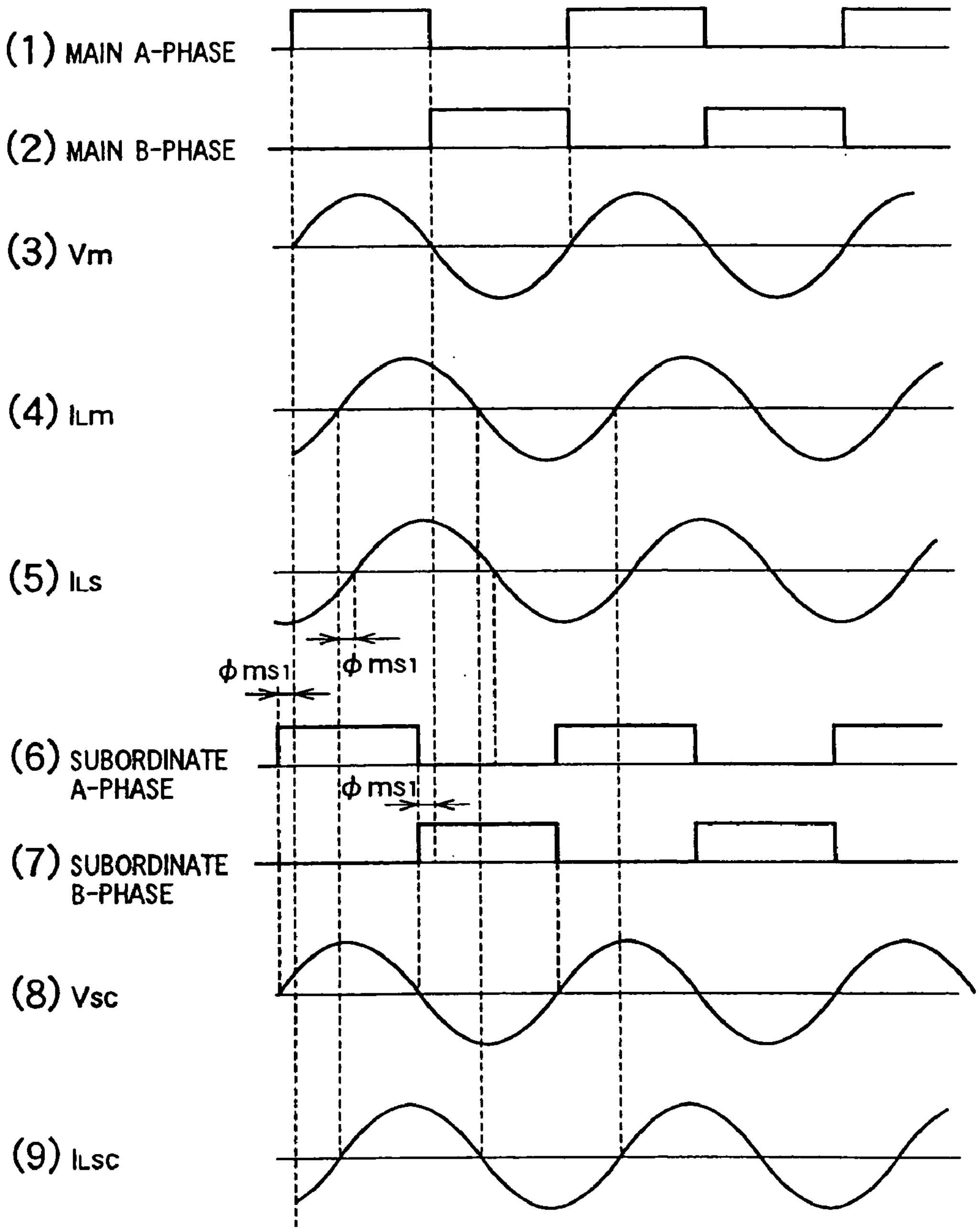
FIG. 13 is a view explaining a method of adjusting a phase of a heating coil current according to the embodiment.

In other words, as shown in FIG. 13 (4), (5), when the phase of the heating coil current $I_{Ls}$ on the subordinate side is behind the phase of the heating coil current $I_{Lm}$ on the main side by $\phi_{ms1}$, a signal indicating the phase difference $\phi_{ms1}$ of the delay is inputted to the phase adjusting circuit 143 from the phase detector 220. Based on the pulse for A phase in FIG. 13 (1) inputted from the gate pulse generator 140*m* on the main side and the phase difference $\phi_{ms1}$ the phase adjusting circuit 143 gives a phase adjusting signal to the gate pulse generator 140*s* so that the gate pulses for A phase and B phase of the inverter 120*s* on the subordinate side are outputted earlier than the gate pulses for A phase and B phase of the inverter 120*m* on the main side by the phase difference $\phi_{ms1}$. Thereby, as shown in FIG. 13 (6), (7), the gate pulse for A phase and the gate pulse for B phase outputted by the gate units 142*s*A, 142*s*B on the subordinate side are outputted earlier by the phase difference $\phi_{ms1}$ than a gate pulse for A phase and a gate pulse for B phase on the main side which are shown in FIG. 13 (1), (2). Therefore, the phase of an output voltage Vsc of the inverter 120*s* after the phase adjustment is ahead of the phase of the output voltage Vm (refer to FIG. 13 (3)) of the inverter 120*m* on the main side by the phase $\phi_{ms1}$, as shown in FIG. 13 (8). Thus, the phase of the heating coil current $I_{Ls}$ supplied to the heating coils 152*s* coincides with the phase of the heating coil current $I_{Lm}$ on the main side as shown in FIG. 13 (8).

On the other hand, when the heating coil current $I_{Ls}$ on the subordinate side is ahead of the heating coil current $I_{Lm}$ on the main side by $\phi_{ms2}$ as shown in FIG. 7 (4), the phase adjusting circuit 143 delays the phase (output timing) of the drive signal (gate pulse) to be given to the gate pulse generator 140*s* so as to eliminate this phase difference $\phi_{ms2}$ so that the phases of the heating coil current $I_{Lm}$ and the heating coil current $I_{Ls}$ coincide with each other.

This makes the phases of the heating coil currents $I_{Lm}$ and $I_{Ls}$ completely coincide with each other even when the load state fluctuates so that the inverters can operate normally without influenced by the load fluctuation. Therefore, even when the heating coils 152*m* and 152*s* are disposed adjacent to each other, the induction heating can be carried out without influenced by the load fluctuation and the temperature control can be performed easily and highly precisely, thereby, enabling the elimination of the disadvantages such as decrease in a heating temperature in a border portion of the heating coils 152*m* and 152*s*. In the embodiment, the power control sections 122*m* and 122*s* are provided in the main heating unit 110*m* and the subordinate heating unit 110*s* respectively to enable independent adjustment of powers supplied to the heating coils 152*m* and 152*s* so that the heating temperature can be made different freely between the heating coils 152*m* and 152*s* and highly precise temperature control can be achieved.

Incidentally, the case when only one subordinate heating unit 110*s* is provided is explained in the above-described first embodiment, but a plurality of the subordinate heating units may be provided. In the case when the plural heating units are provided, any one of the heating units may be used as the main one which serves as the reference. Moreover, in the first embodiment, the explanation is given on the case when the voltage Vs and the current Is are inputted to the phase difference detecting section 172 of the phase control section 170 at the time the phases of the current Is and the voltage Vs on the subordinate side are made to coincide with each other, but the gate pulse given to the transistors of the inverter 120*s* on the subordinate side may be used instead of the current Is. Further, the case when the heating coils 152*m*, 152*s* are disposed adjacent to each other is explained in the above-described embodiment, but the present invention is of course applicable to a case when the heating coils 152*m* and 152*s* are not disposed adjacent to each other. Moreover, in the above-described first embodiment, the explanation is given on the case when the variable reactor section 162 provided on the subordinate side is composed of the variable capacity reactance 164 and the variable induction reactance 166, but the variable reactor section 162 may be formed of either the variable capacity reactance 164 or the variable induction reactance 166. Furthermore, the case when the phases of the heating coil currents $I_{Lm}$ and $I_{Ls}$ of the inverter 120*m* on the main side and the inverter 120*s* on the subordinate side are made to coincide (synchronize) with each other is explained in the above-described first embodiment, but a predetermined phase difference may be maintained between both of them when necessary.

Figure 6:
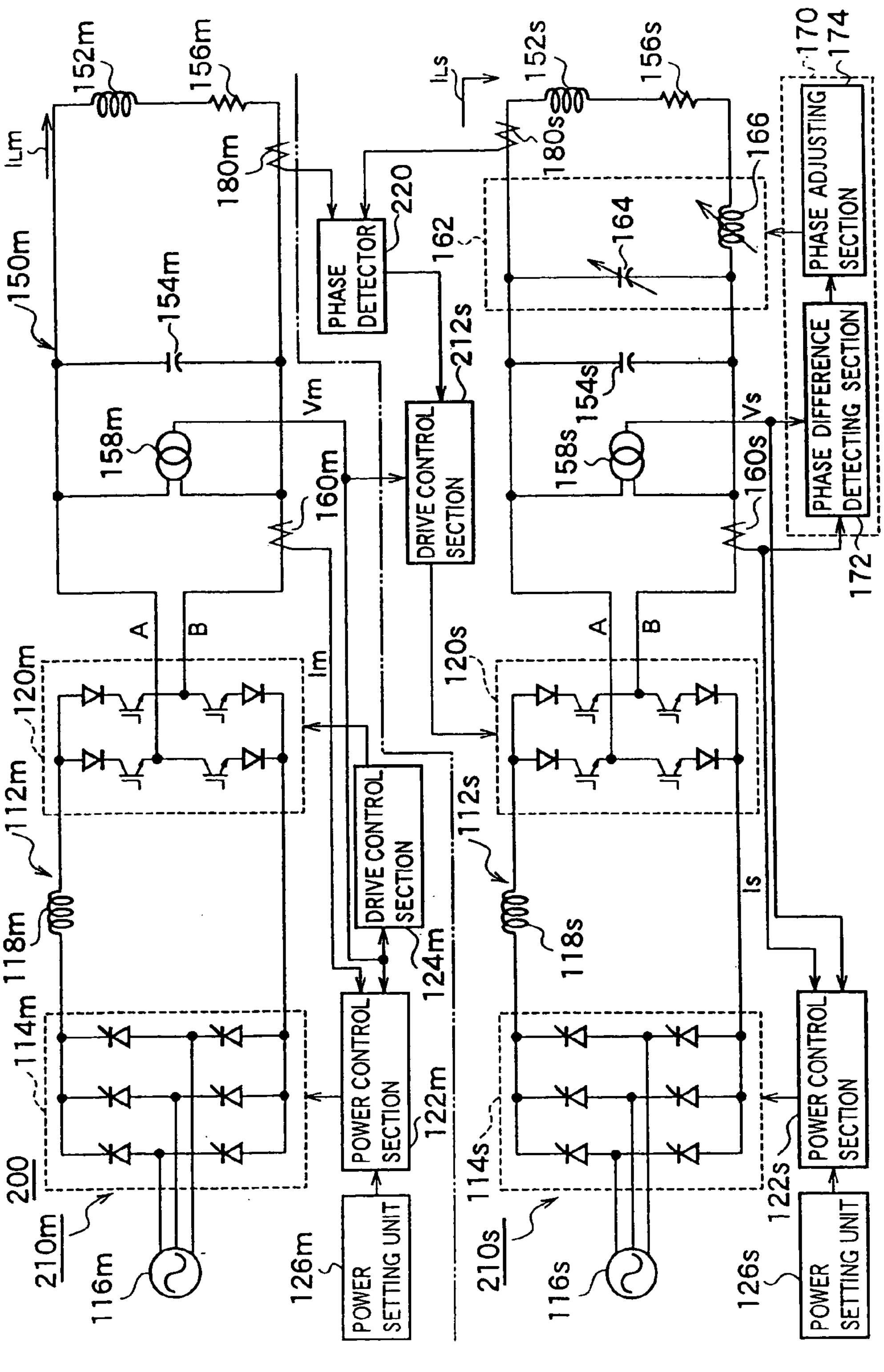
FIG. 6 is an explanatory view of a second embodiment of the present invention.

FIG. 6 is an explanatory view of a second embodiment. An induction heating unit 200 of the second embodiment is composed of a main heating unit 210*m* and a subordinate heating unit 210*s*. A drive control section 124*m* on a main side is structured to output a gate pulse only to an inverter 120*m* on the main side. A drive control section 212*s* on a subordinate side is so structured that a voltage Vm of a transformer 158*m* on the main side is inputted thereto and it generates a drive signal (gate pulse) of transistors constituting an inverter 120*s* on the subordinate side based on this voltage Vm. In other words, in the second embodiment, the output voltage Vm of the inverter 120*m* on the main side is inputted instead of an output pulse of a gate pulse generator 140*m* on the main side to a phase adjusting circuit 143 of a drive control section 124*s* (212*s*) on the subordinate side as shown by the broken line in FIG. 3. The other configuration is similar to that of the first embodiment described above.

In the second embodiment thus configured, the drive control section 212*s* on the subordinate side, when the voltage Vm on the main side is inputted thereto, detects a zero cross of the voltage Vm similarly to the drive control section 124*m* on the main side, generates a transistor gate pulse for A phase and a transistor gate pulse for B phase in synchronization with this zero cross, and gives them as drive signals to bases of respective transistors of the inverter 120*s*. Thereby, the same effect can be obtained as that in the above-described embodiment.

Incidentally, it is also suitable that a current Im outputted by a current transformer 160*m* on the main side is inputted to the drive control section 212*s* on the subordinate side, the transistor gate pulse is generated based on this current Im, this is given to the transistors of the inverter 120*s* on the subordinate side, and the inverter 120*s* on the subordinate side is operated in synchronization with the current Im on the main side.

Figure 14:
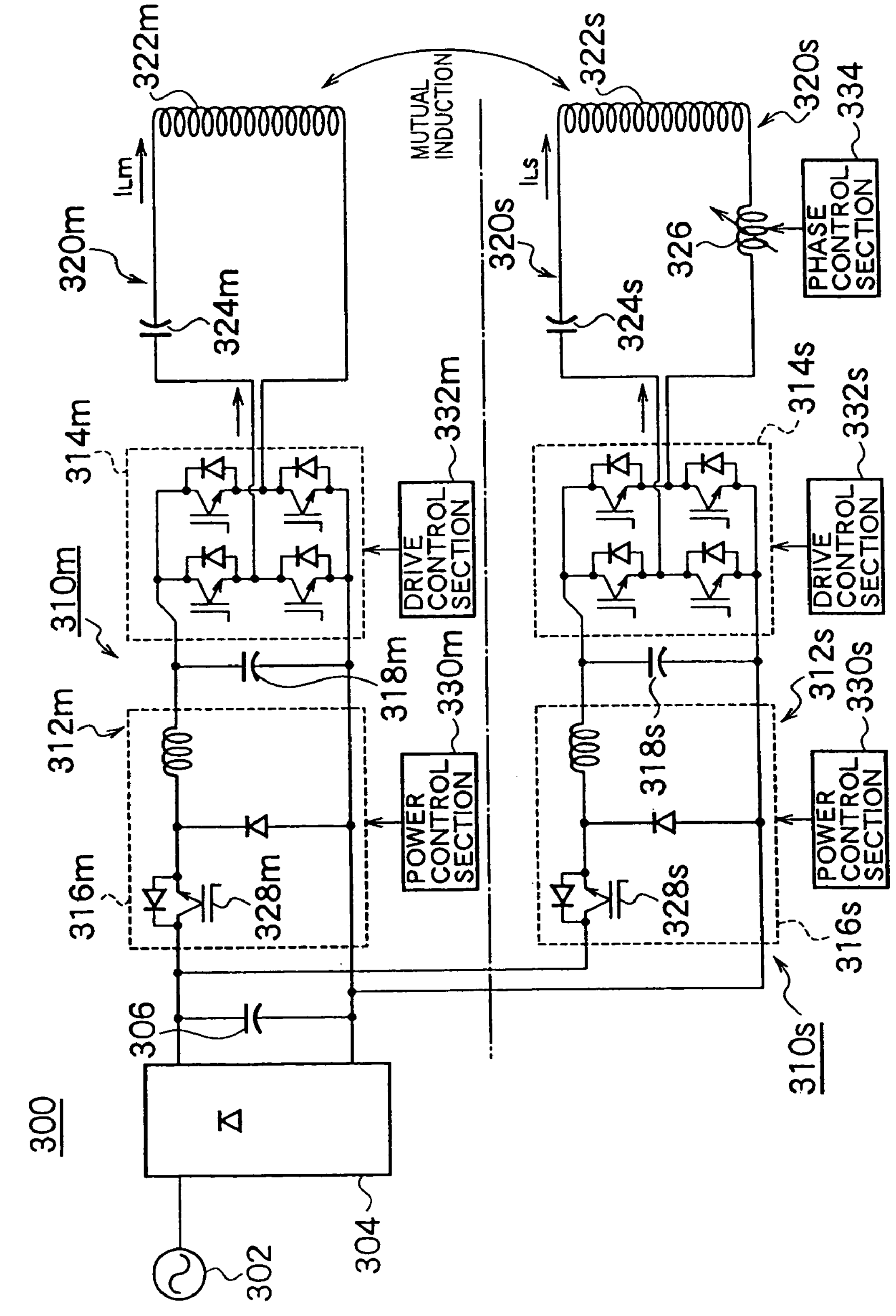
FIG. 14 is a diagrammatic explanatory view of a third embodiment according to the present invention.

FIG. 14 is a diagrammatic explanatory view of a third embodiment, showing an example where the present invention is applied to a voltage-type inverter. In FIG. 14, an induction heating unit 300 is so configured that a forward converting section 304 is connected to an AC power supply 302 and a smoothing condenser 306 is provided on an output side of this forward converting section 304. Further, the induction heating unit 300 is so configured that a heating unit 310*m* on a main side and a heating unit 310*s* on a subordinate side are connected in parallel to the smoothing condenser 306.

The heating units 310*m*, 310*s* have DC power supply sections 312*m*, 312*s*, inverters 314*m*, 314*s*, and load coil sections 320*m*, 320*s* respectively. The DC power supply sections 312*m*, 312*s* are composed of generally known chopper circuits 316*m*, 316*s* and condensers 318*m*, 318*s* provided on output sides thereof. Each of arms of each of the inverters 314*m*, 314*s* is constituted by a bridge circuit which is composed of a transistor and a diode connected to this transistor in inverse-parallel. The load coil sections 320*m*, 320*s* are connected to output sides of the inverters 314*m*, 314*s*. Each of the load coil sections 320*m*, 320*s* is a series resonance type, in which each of the heating coils 322*m*, 322*s* and the condensers 324*m*, 324*s* are connected in series. A variable reactor 326 is provided in series to the heating coil 322*s* in the load coil section 320*s* on the subordinate side.

Furthermore, power control sections 330*m*, 330*s* are connected to the chopper circuits 316*m*, 361*s* of the heating units 310*m*, 310*s* respectively. The power control sections 330*m*, 330*s* turn on/off chop sections 328*m*, 328*s*, which are formed by inverse parallel connection of transistors and diodes, of the chopper circuits 316*m*, 316*s*, and vary conduction ratios of the chopper circuits 316*m*, 316*s*. Consequently, in the DC power supply sections 312*m*, 312*s*, the amount of voltages at both ends of the condensers 318*m*, 318*s* changes to change the amount of voltages to be given to the inverters 314*m*, 314*s* so that output voltages of the inverters 314*m*, 314*s* are changed. To the inverters 314*m*, 314*s*, drive control sections 332*m*, 332*s* for controlling the drive of the inverters are connected respectively. Moreover, a phase control section 334 for controlling the variable reactor 326 provided in the load coil section 320*s* is connected to the subordinate side. Incidentally, internal resistances of the heating coils 322*m*, 322*s* are omitted in FIG. 14.

In the induction heating unit 300 of this third embodiment, voltages Vm, Vs and currents (heating coil currents) $I_{Lm}$, $I_{Ls}$ outputted by the inverters 314*m*, 314*s* are detected by transformers and current transformers which are not shown in FIG. 14 and inputted to the power control sections 330*m*, 330*s*. The power control sections 330*m*, 330*s* obtain output powers of the inverters 314*m*, 314*s* from the inputted voltages and currents, compare them with set values of power setting units which are not shown in FIG. 13, and adjust widths of drive pulses of the chop sections 328*m*, 328*s* to make the output voltages have the set values.

The drive control section 332*m* on the main side, to which the output current of the inverter 314*m* is inputted, detects a zero cross of this output current and generates a drive signal (gate pulse) for driving each of the transistors of the inverter 314*m* to give it to each of the transistors of the inverter 314*m*. Meanwhile, to the drive control section 332*s* on the subordinate side, to which a phase detector not shown in FIG. 14 is connected, a phase difference $\phi_{ms}$ between a heating coil current $I_{Lm}$ on the main side and a heating coil current $I_{Ls}$ on the subordinate side which is outputted by the phase detector is inputted and the gate pulse outputted by the drive control section 332*m* on the main side is inputted. Then, the drive control section 332*s* outputs a drive signal (gate pulse) to be given to the inverter 314*s*, adjusting a phase (output timing) of the drive signal according to the phase difference $\phi_{ms}$ between the heating coil current $I_{Lm}$ on the main side and the heating coil current $I_{Ls}$ on the subordinate side based on the gate pulse inputted from the drive control section 332*m* on the main side to make the phase difference $\phi_{ms}$ become zero or to make the phase difference $\phi_{ms}$ become a predetermined phase difference Φ. Thereby, the inverters 314*m*, 314*s* can be operated, with the phases of the heating coil currents $I_{Lm}$, $I_{Ls}$ on the main side and the subordinate side synchronized with each other or with the phase difference Φ maintained between them. Therefore, in the induction heating unit 300, even when load fluctuates, the inverters 314 can be normally operated since the phases of the heating coil currents $I_{Lm}$, $I_{Ls}$ coincide with each other or the predetermined phase difference Φ is maintained between them so that temperature decrease and so on in a border portion of the heating coils 322*m*, 322*s* can be prevented.

The phase control section 334 provided on the subordinate side reads the voltage and the current outputted by the inverter 314*s* and obtains a phase difference ϕ between them. When the phase difference exists between the voltage and the current, the phase control section 334 adjusts the variable reactor 326 to make the phases of both of them coincide with each other. Thereby, a power factor of the inverter 314*s* is improved to enhance operation efficiency of the inverter 314*s*.

Figure 15:
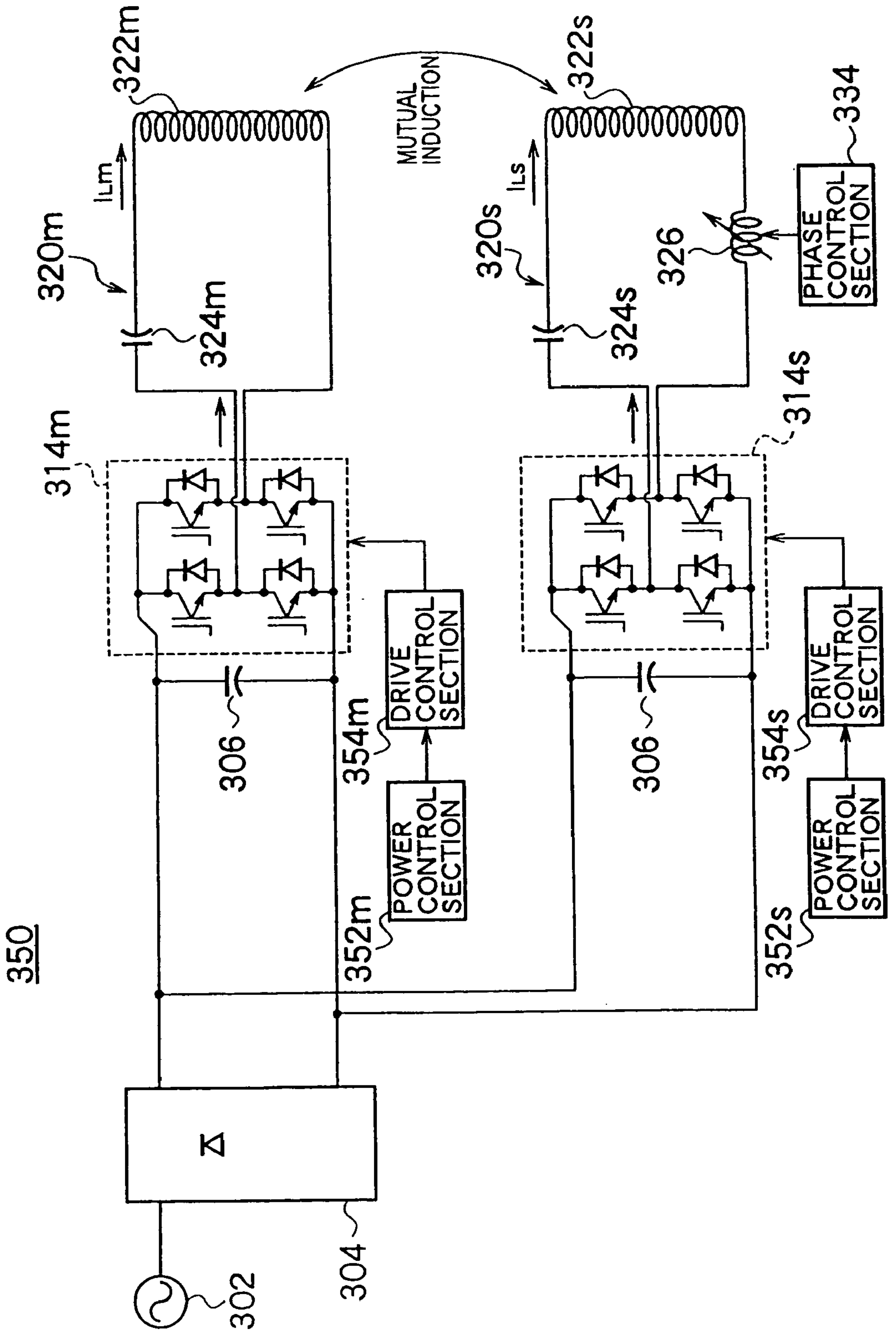
FIG. 15 is a diagrammatic explanatory view of a fourth embodiment according to the present invention.

FIG. 15 is a diagrammatic explanatory view of a fourth embodiment. An induction heating unit 350 according to this fourth embodiment has voltage-type inverters 314*m*, 314*s* on a main side and a subordinate side. These inverters 314*m*, 314*s* are so structured that output powers thereof are controlled by a pulse width modulation (PWM) method. In other words, power control sections 352*m*, 352*s* are connected to the inverters 314*m*, 314*s* via drive control sections 354*m*, 354*s* respectively.

The power control sections 352*m*, 352*s* compare the output powers of the corresponding inverters 314*m*, 314*s* with set values. The power control sections 352*m*, 352*s* obtain pulse widths for driving the inverters 314*m*, 314*s* so as to make the output powers of the inverters 314*m*, 314*s* have the set values and output them to the corresponding drive control sections 354*m*, 354*s*. The drive control section 354*m* on the main side detects a zero cross of an output current of the inverter 314*m* on the main side and gives a gate pulse having the pulse width which is obtained by the power control section 352*m* to the inverter 314*m*. Specifically, when the output power of the inverter 314*m* is smaller than the set value, the drive control section 354*m* outputs the gate pulse having a longer pulse width to lengthen the time during which transistors constituting the inverters 314*m* are turned on, thereby increasing the output power.

The drive control section 354*s* on the subordinate side obtains a phase difference $\phi_{ms}$ between a heating coil current $I_{Lm}$ on the main side and a heating coil current $I_{Ls}$ on the subordinate side in the similar manner described above, adjusts a phase (output timing) of a drive signal (gate pulse) to be given to the inverter 314*s* so as to make this phase difference $\phi_{ms}$ zero, and outputs the gate pulse. This gate pulse has the pulse width obtained by the power control section 352*s*. A phase control section 334 adjusts a variable reactor 326 so as to make the phase difference ϕ between an output voltage and an output current of the inverter 314*s* on the subordinate side zero similarly to the above and adjusts a power factor of the inverter 314*s*.

In these induction heating unit 300 of the third embodiment and the induction heating unit 350 of the fourth embodiment, the inverters 314*m*, 314*s* may also be operated while a phase difference to be set between the heating coil current $I_{Lm}$ on the main side and the heating coil current $I_{Ls}$ on the subordinate side are maintained, when necessary.

Figure 16:
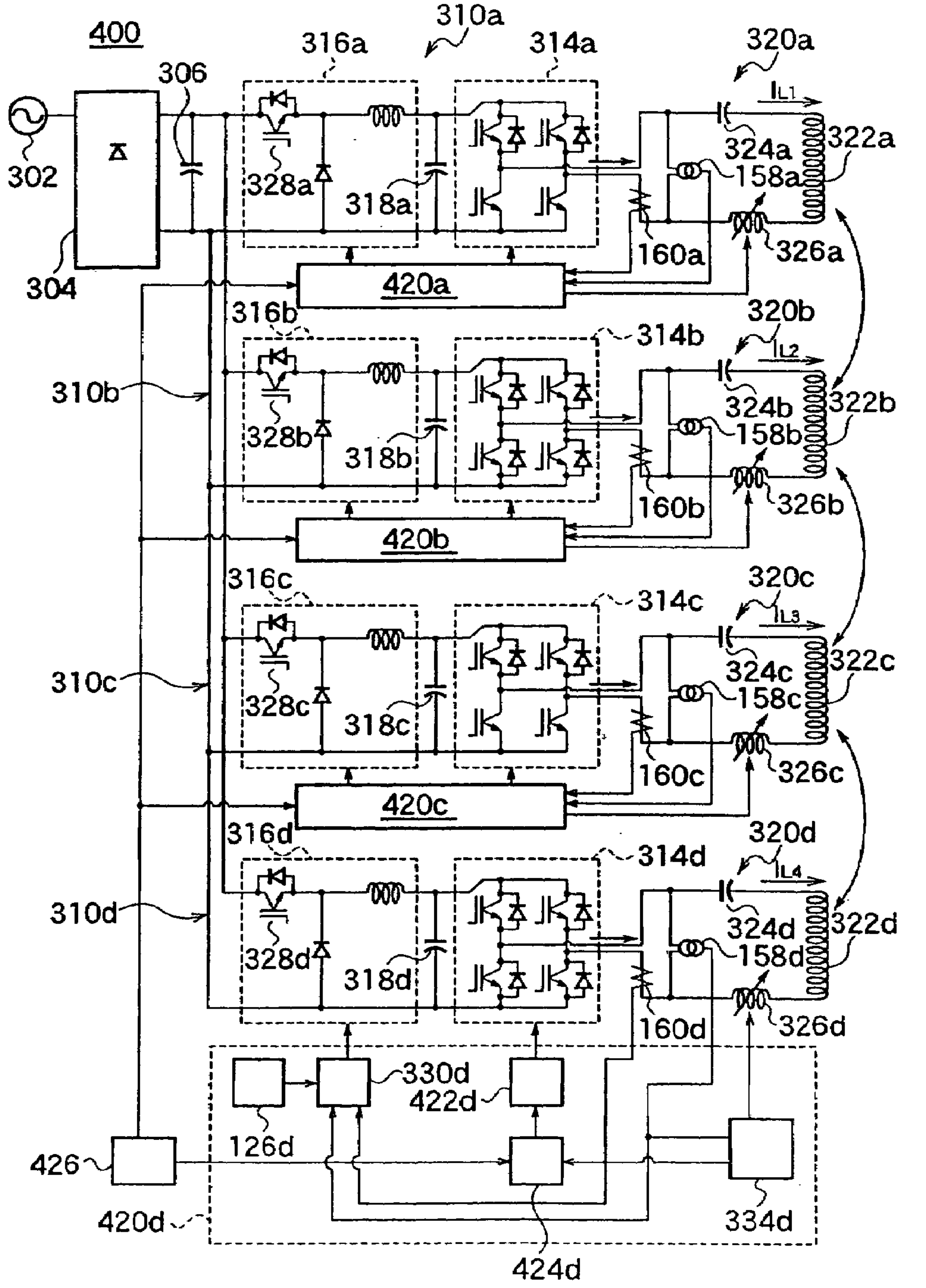
FIG. 16 is an explanatory view of a fifth embodiment according to the present invention.

FIG. 16 is an explanatory view of a fifth embodiment. An induction heating unit 400 shown in FIG. 16 is so structured that a plurality (four in the embodiment) of heating units 310 (310*a* to 310*d*) are connected in parallel to a smoothing condenser 306 provided on an output side of a forward converting section 304. These heating units 310, which are provided with voltage-type inverters, have chopper circuits 316 (316*a* to 316*d*) and inverters 314 (314*a* to 314*d*) connected to output sides of the chopper circuits 316 via condensers 318 (318*a* to 318*d*). To these inverters 314, which are series resonance-type inverters, connected are load coil sections 320 (320*a* to 320*d*) in which heating coils 322 (322*a* to 322*d*) and condensers 324 (324*a* to 324*d*) are connected in series. Variable reactors 326 (326*a* to 326*d*) are connected in series to the heating coils 322 in the load coil sections 320. Furthermore, in the load coil sections 320, transformers 158 (158*a* to 158*d*) and current transformers 160 (160*a* to 160*d*) are provided so that output voltages and output currents of the inverters 314 can be detected.

The induction heating unit 400 has control units 420 (420*a* to 420*d*) provided to correspond to the respective heating units 310. The control units 420*a* to 420*d* have the same configuration. The concrete configuration of these control units 420 is shown as a block diagram of the control unit 420*d*.

The control unit 420*d* has a power control section 330*d*. To the power control section 330*d*, a set value is inputted from a power setting unit 126*d*. To the power control section 330*d*, to which a transformer 158*d* and a current transformer 160*d* provided in the load coil section 320*d* are connected thereto, an output voltage and an output current (heating coil current $I_{L4}$) of the inverter 314*d* detected by them are also inputted. The power control section 330*d* obtains an output power of the inverter 314*d* from a voltage value and a current value which are inputted from the transformer 158*d* and the current transformer 160*d*, and compares it with the set value outputted by the power setting unit 126*d*. Then, the power control section 330*d* adjusts the length of a gate pulse to be given to a chop section 328*d* of the chopper circuit 316*d* so as to make the output power of the inverter 314*d* have the set value.

The control unit 420*d* further includes a drive control section 422*d* for controlling the drive of the inverter 314*d*. A phase detector 424*d* is connected to an input side of this drive control section 422*d*. To the phase detector 424*d*, an output signal of the current transformer 160*d* is inputted and an output signal of a reference signal generating section 426 is inputted. In the embodiment, the reference signal generating section 426 generates a waveform of heating coil currents $I_L$ ($I_{L1}$ to $I_{L4}$) supplied to the heating coils 322. Then, the reference signal generating section 426 gives the generated current waveform to phase detectors 424*a* to 424*d* (the phase detectors 424*a* to 424*c* are not shown) provided in the respective control units 420*a* to 420*d* as a reference signal. The phase detector 424*d* compares a phase of the heating current $I_{L4}$ detected by the current transformer 160*d* with a phase of the reference current waveform outputted by the reference signal generating section 426 and obtains a phase difference between them to input it to the drive control section 422*d*.

The drive control section 422*d* outputs a gate pulse (drive signal) to be given to each of transistors constituting the inverter 314*d*, adjusting its phase (output timing) to make the phase of the heating coil current $I_{L4}$ coincide with the phase of the reference current waveform, and gives it to each of the transistors of the inverters 314*d*. Drive control sections of the respective control units 420*a* to 420*d* similarly adjust phases of gate pulses to be given to the inverters 314*a* to 314*c* so as to make them coincide with the phase of the reference current waveform outputted by the reference signal generating section 426. Thereby, the phases of the heating coil currents $I_{L1}$ to $I_{L4}$ to be supplied to the respective heating coils 322*a* to 322*d* are synchronized so that the change in the state of mutual induction among the heating coils 322 can be prevented even when the load state is changed. Therefore, even when the heating coils 322 are disposed adjacent to one another, the heating coil currents $I_L$ supplied to the heating coils 322 are not influenced by the change in the load state so that temperature control can be performed easily and surely and temperature decrease in border portions of the heating coils 322 can be prevented.

Incidentally, a phase control section 334*d* provided in the control unit 420*d* detects, based on the output voltage and the output current (heating coil current) of the inverter 314*d* which are detected by the transformer 154*d* and the current transformer 160*d*, a phase difference $\phi$ between them and adjusts the variable reactor 326*d* so as to make the phase difference $\phi$ zero, namely, to synchronize the output voltage and the output current. Thereby, a power factor of the inverter 314*d* is improved so that operation efficiency of the inverter 314*d* can be enhanced. The control units 420*a* to 420*c* perform control operations similarly to the control unit 420*d*.

Incidentally, the case when the phases of the heating coil currents $I_{L1}$ to $I_{L4}$ are synchronized is explained in this embodiment, but the inverters 314 may be operated while a phase difference to be set is maintained among the heating coil currents, when necessary, or the inverters 314 may be operated in such a manner that a phase difference to be set is maintained between an optional one of the heating coil currents and the other heating coil currents. Furthermore, the case when the reference signal generating section 426 outputs the current waveform as the reference signal is explained in this embodiment, but the reference signal may be the gate pulse or the like given to the inverters 314. Moreover, the case when the heating coil currents are synchronized with the signal outputted by the reference signal generating section 426 is explained in this embodiment, but any one of the plural inverters 314 may be used as a reference inverter, thereby using the output of this inverter as the reference signal. Furthermore, the case when the synchronization with the output signal of the reference signal generating section 426 is performed is explained in the embodiment, but an average of the phases of the heating coil currents $I_L$ may be used as the reference signal. In this case, the average phase of the heating coil currents can be obtained at the time when the induction heating unit 400 starts its operation, or based on a pulse outputted at a predetermined interval. It should be understood that the present invention is not limited to the content explained above. In other words, the present invention is applicable not only to inverters represented by basic circuits shown in FIG. 17 and FIG. 18 but also to any kind of resonance-type inverters.

Figure 17:
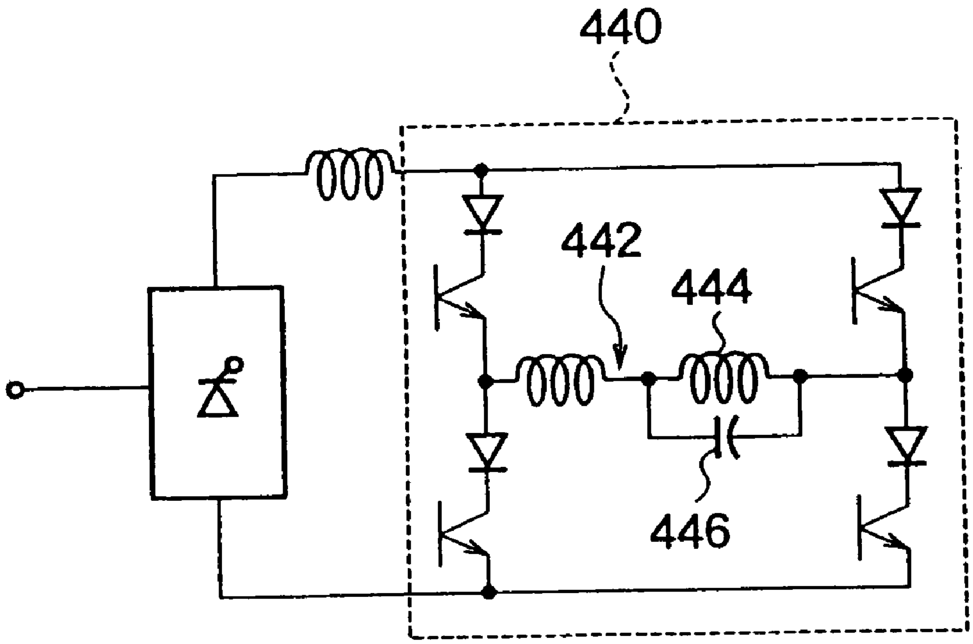
FIG. 17 is a basic circuit diagram of a parallel resonance-type inverter.
Figure 18:
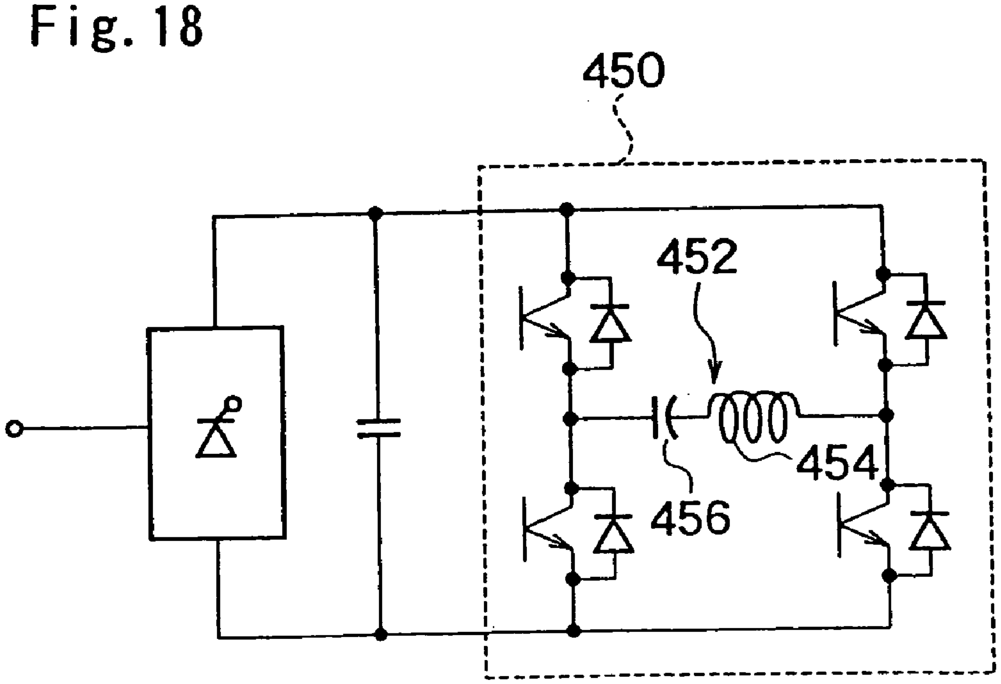
FIG. 18 is a basic circuit diagram of a series resonance-type inverter.

The circuit shown in FIG. 17 is a parallel resonance-type inverter and is so structured that each of arms of an inverter 440 is constituted of a transistor and a diode connected in series. In a load section 442 connected to the inverter 440, a heating coil (load coil) 444 and a condenser 446 are connected in parallel. The circuit shown in FIG. 18 is a series resonance-type inverter and is so structured that each of arms of an inverter 450 is constituted by inverse parallel connection of a transistor and a diode. In a load section 452 connected to the inverter 450, a heating coil 454 and a condenser 456 are connected in series.

As described hitherto, in the case when electricity is supplied to the plural heating coils by the resonance-type inverters respectively corresponding to the plural heating coils, since the operation in the present invention is performed in such a manner that the frequencies of the currents supplied to the respective heating coils are equalized to each other as well as the phases of the currents are synchronized or the phase difference to be set is maintained, the inverters can operate normally even when the load state is changed. Therefore, according to the present invention, the temperature control can be performed easily and surely without influenced by the load fluctuation and the temperature decrease in the border portions of the plural heating coils can be prevented. In addition, since the phase difference between the output current and the output voltage of the inverter is adjusted, a power factor of the inverter is improved so that degradation in operation efficiency can be prevented.

INDUSTRIAL AVAILABILITY

When induction heating by connecting a plurality of heating coils is carried out, temperature decrease in a border portion of each of the heating coils can be prevented and resonance-type inverters can be operated without influenced by load fluctuation.

What is claimed is:

1. An induction heating method, wherein a plurality of heating coils are supplied with electricity by resonance-type inverters respectively corresponding to said heating coils; with one of said resonance-type inverters being a main inverter and the other being a subordinate inverter, said subordinate inverter is driven in such a manner that a phase of a current supplied to said heating coil on a subordinate side is synchronized with a phase of a current supplied to said heating coil on said main side or maintained at a phase difference to be set, based on a drive signal of said main inverter or an output voltage or an output frequency of said main inverter; and a phase difference between an output current and an output voltage of said subordinate inverter is adjusted by controlling a reactor on a subordinate inverter side to improve a power factor.

2. An induction heating method according to claim 1, wherein the phase difference between the output current and the output voltage of said subordinate inverter is adjusted after the phase difference between the current supplied to said heating coil on the main side and the current supplied to said heating coil on the subordinate side is obtained and said phase difference between the currents is adjusted by controlling the drive of said subordinate inverter.

* * * * *